(12) United States Patent
King et al.

(10) Patent No.: US 7,661,812 B2
(45) Date of Patent: *Feb. 16, 2010

(54) PRINTER UNIT FOR ASSEMBLY WITH IMAGE READER UNIT

(75) Inventors: Tobin Allen King, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/264,749

(22) Filed: Nov. 4, 2008

(65) Prior Publication Data

US 2009/0058893 A1 Mar. 5, 2009

Related U.S. Application Data

(63) Continuation of application No. 11/592,996, filed on Nov. 6, 2006, now Pat. No. 7,513,615, which is a continuation of application No. 11/014,721, filed on Dec. 20, 2004, now Pat. No. 7,152,972, which is a continuation-in-part of application No. 10/760,254, filed on Jan. 21, 2004, now Pat. No. 7,448,734.

(51) Int. Cl.
*B41J 29/00* (2006.01)
(52) U.S. Cl. .................. 347/104; 347/108; 271/207
(58) Field of Classification Search .................. 347/104
See application file for complete search history.

(56) References Cited

U.S. PATENT DOCUMENTS

| | | | |
|---|---|---|---|
| 4,755,877 A * | 7/1988 | Vollert | 347/3 |
| 4,968,016 A | 11/1990 | Koyama | |
| 4,985,710 A | 1/1991 | Drake | |
| 5,019,839 A * | 5/1991 | Watanabe et al. | 347/104 |
| 5,159,348 A * | 10/1992 | Dietl et al. | 347/89 |
| 5,160,945 A | 11/1992 | Drake | |
| 5,216,442 A | 6/1993 | Parks et al. | |
| 5,221,397 A | 6/1993 | Nystrom | |
| 5,431,389 A * | 7/1995 | Wensink et al. | 271/273 |
| 5,532,825 A * | 7/1996 | Lim et al. | 347/108 |
| 5,624,196 A * | 4/1997 | Jackson et al. | 347/104 |
| 5,682,186 A | 10/1997 | Bohorquez et al. | |
| 5,711,516 A | 1/1998 | Pan | |
| 5,730,537 A | 3/1998 | Kelly et al. | |
| 5,746,528 A | 5/1998 | Mayer et al. | |
| 5,751,311 A | 5/1998 | Drake | |
| 5,997,121 A | 12/1999 | Altfather et al. | |
| 6,017,117 A | 1/2000 | McClelland et al. | |
| 6,270,177 B1 | 8/2001 | King et al. | |
| 6,281,912 B1 | 8/2001 | Silverbrook | |
| 6,290,350 B1 | 9/2001 | Kono | |

(Continued)

FOREIGN PATENT DOCUMENTS

CN 1196538 A 10/1998

(Continued)

*Primary Examiner*—Jill E Culler

(57) ABSTRACT

A printer unit is provided having a body with a media input assembly for supporting media to be printed, and securing means for releasable engagement with complementary securing means on an image reader unit, and a print engine with a printhead and a control system to control the operation of the printhead. The body is shaped for nesting with the image reader unit such that the securing means are positioned for releasable engagement with the complementary securing means.

11 Claims, 32 Drawing Sheets

U.S. PATENT DOCUMENTS

| | | |
|---|---|---|
| 6,382,769 B1 | 5/2002 | Silverbrook |
| 6,435,745 B1 | 8/2002 | Yamada |
| 6,439,908 B1 | 8/2002 | Silverbrook et al. |
| 6,443,555 B1 | 9/2002 | Silverbrook et al. |
| 6,481,829 B1 | 11/2002 | Bailey et al. |
| 6,554,398 B2 | 4/2003 | Wyangaert et al. |
| 6,557,976 B2 | 5/2003 | McElfresh et al. |
| 6,581,834 B2 * | 6/2003 | Chien .................. 235/454 |
| 6,652,082 B2 | 11/2003 | Silverbrook |
| 6,672,706 B2 | 1/2004 | Silverbrook |
| 6,679,584 B2 | 1/2004 | Silverbrook |
| 6,714,326 B1 | 3/2004 | Yamada |
| 2004/0130732 A1 | 7/2004 | Denpo |
| 2005/0035998 A1 | 2/2005 | Ando et al. |
| 2005/0157143 A1 | 7/2005 | King et al. |

FOREIGN PATENT DOCUMENTS

| | | |
|---|---|---|
| EP | 1035725 A2 | 9/2000 |
| EP | 1041810 B1 | 4/2003 |
| EP | 1041811 B1 | 4/2003 |
| JP | 03-234651 | 10/1991 |
| JP | 10-063454 A | 3/1998 |
| JP | 2002-127426 | 5/2002 |
| JP | 2002-210940 A | 7/2002 |
| JP | 2002-295419 A | 10/2002 |
| JP | 2003-163774 A | 6/2003 |
| JP | 2003-196774 A | 6/2003 |
| WO | WO 00/54973 | 9/2000 |
| WO | WO 01/39981 A1 | 6/2001 |
| WO | WO 01/42028 A | 6/2001 |
| WO | WO 03/069890 A1 | 8/2003 |
| WO | WO 03/086770 A1 | 10/2003 |

* cited by examiner

PRINTER UNIT FOR ASSEMBLY WITH IMAGE READER UNIT

CROSS REFERENCE TO RELATED APPLICATIONS

The present application is a Continuation of U.S. application Ser. No. 11/592,996 filed on Nov. 6, 2006, now issued U.S. Pat. No. 7,513,615, which is a Continuation of U.S. application Ser. No. 11/014,721 filed on Dec. 20, 2004, now issued U.S. Pat. No. 7,152,972, which is a Continuation-In-Part Application of U.S. application Ser. No. 10/760,254 filed on Jan. 21, 2004, now issued U.S. Pat. No. 7,448,734. In the interests of brevity, the disclosure of the parent application is incorporated in its entirety into the present specification by cross reference.

FIELD OF THE INVENTION

The present invention relates to a printer unit, and more particularly to an inkjet printer unit provided in combination with an image reading unit to function as a multi-functional image processing unit.

CO-PENDING APPLICATIONS

The following applications have been filed by the Applicant simultaneously with U.S. Pat. No. 7,152,972:

| | | | | |
|---|---|---|---|---|
| 11/014,731 | 11/014,764 | 11/014,763 | 7,331,663 | 7,360,861 |
| 7,328,973 | 7,427,121 | 7,407,262 | 7,303,252 | 7,249,822 |
| 11/014,762 | 7,311,382 | 7,360,860 | 7,364,257 | 7,390,075 |
| 7,350,896 | 7,429,096 | 7,384,135 | 7,331,660 | 7,416,287 |
| 11/014,737 | 7,322,684 | 7,322,685 | 7,311,381 | 7,270,405 |
| 7,303,268 | 11/014,735 | 7,399,072 | 7,393,076 | 11/014,750 |
| 11/014,749 | 7,249,833 | 11/014,769 | 11/014,729 | 7,331,661 |
| 11/014,733 | 7,300,140 | 7,357,492 | 7,357,493 | 11/014,766 |
| 7,380,902 | 7,284,816 | 7,284,845 | 7,255,430 | 7,390,080 |
| 7,328,984 | 7,350,913 | 7,322,671 | 7,380,910 | 7,431,424 |
| 11/014,716 | 11/014,732 | 7,347,534 | 7,306,320 | 7,377,635 |
| 11/014,727 | 11/014,730 | | | |

The disclosures of these co-pending applications are incorporated herein by reference.

CROSS REFERENCES TO RELATED APPLICATIONS

The following patents or patent applications filed by the applicant or assignee of the present invention are hereby incorporated by cross-reference.

| | | | | |
|---|---|---|---|---|
| 7,364,256 | 7,258,417 | 7,293,853 | 7,328,968 | 7,270,395 |
| 11/003,404 | 11/003,419 | 7,334,864 | 7,255,419 | 7,284,819 |
| 7,229,148 | 7,258,416 | 7,273,263 | 7,270,393 | 6,984,017 |
| 7,347,526 | 11/003,463 | 7,364,255 | 7,357,476 | 11/003,614 |
| 7,284,820 | 7,341,328 | 7,246,875 | 7,322,669 | 6,623,101 |
| 6,406,129 | 6,505,916 | 6,457,809 | 6,550,895 | 6,457,812 |
| 7,152,962 | 6,428,133 | 7,204,941 | 7,282,164 | 10/815,628 |
| 7,278,727 | 7,417,141 | 10/913,374 | 7,367,665 | 7,138,391 |
| 7,153,956 | 7,423,145 | 10/913,379 | 10/913,376 | 7,122,076 |
| 7,148,345 | 7,416,280 | 7,252,366 | 10/683,064 | 7,360,865 |
| 7,275,811 | 10/884,889 | 10/922,890 | 7,334,874 | 7,393,083 |
| 10/922,889 | 10/922,884 | 10/922,879 | 10/922,887 | 10/922,888 |
| 10/922,874 | 7,234,795 | 7,401,884 | 7,328,975 | 7,293,855 |
| 7,410,250 | 7,401,900 | 10/922,878 | 7,410,243 | 7,360,871 |
| 10/922,877 | 6,746,105 | 7,156,508 | 7,159,972 | 7,083,271 |
| 7,165,834 | 7,080,894 | 7,201,469 | 7,090,336 | 7,156,489 |
| 7,413,283 | 10/760,246 | 7,083,257 | 7,258,422 | 7,255,423 |
| 7,219,980 | 10/760,253 | 7,416,274 | 7,367,649 | 7,118,192 |
| 10/760,194 | 7,322,672 | 7,077,505 | 7,198,354 | 7,077,504 |
| 10/760,189 | 7,198,355 | 7,401,894 | 7,322,676 | 7,152,959 |
| 7,213,906 | 7,178,901 | 7,222,938 | 7,108,353 | 7,104,629 |
| 7,246,886 | 7,128,400 | 7,108,355 | 6,991,322 | 7,287,836 |
| 7,118,197 | 10/728,784 | 7,364,269 | 7,077,493 | 6,962,402 |
| 10/728,803 | 7,147,308 | 10/728,779 | 7,118,198 | 7,168,790 |
| 7,172,270 | 7,229,155 | 6,830,318 | 7,195,342 | 7,175,261 |
| 10/773,183 | 7,108,356 | 7,118,202 | 10/773,186 | 7,134,744 |
| 10/773,185 | 7,134,743 | 7,182,439 | 7,210,768 | 10/773,187 |
| 7,134,745 | 7,156,484 | 7,118,201 | 7,111,926 | 7,431,433 |
| 09/575,197 | 7,079,712 | 6,825,945 | 7,330,974 | 6,813,039 |
| 6,987,506 | 7,038,797 | 6,980,318 | 6,816,274 | 7,102,772 |
| 7,350,236 | 6,681,045 | 6,728,000 | 7,173,722 | 7,088,459 |
| 09/575,181 | 7,068,382 | 7,062,651 | 6,789,194 | 6,789,191 |
| 6,644,642 | 6,502,614 | 6,622,999 | 6,669,385 | 6,549,935 |
| 6,987,573 | 6,727,996 | 6,591,884 | 6,439,706 | 6,760,119 |
| 7,295,332 | 7,064,851 | 6,826,547 | 6,290,349 | 6,428,155 |
| 6,785,016 | 6,831,682 | 6,741,871 | 6,927,871 | 6,980,306 |
| 6,965,439 | 6,840,606 | 7,036,918 | 6,977,746 | 6,970,264 |
| 7,068,389 | 7,093,991 | 7,190,491 | 10/901,154 | 10/932,044 |
| 10/962,412 | 7,177,054 | 7,364,282 | 10/965,733 | 10/965,933 |
| 10/974,742 | 10/986,375 | 6,982,798 | 6,870,966 | 6,822,639 |
| 6,737,591 | 7,055,739 | 7,233,320 | 6,830,196 | 6,832,717 |
| 6,957,768 | 7,170,499 | 7,106,888 | 7,123,239 | 10/727,181 |
| 10/727,162 | 7,377,608 | 7,399,043 | 7,121,639 | 7,165,824 |
| 7,152,942 | 10/727,157 | 7,181,572 | 7,096,137 | 7,302,592 |
| 7,278,034 | 7,188,282 | 10/727,159 | 10/727,180 | 10/727,179 |
| 10/727,192 | 10/727,274 | 10/727,164 | 10/727,161 | 10/727,198 |
| 10/727,158 | 10/754,536 | 10/754,938 | 10/727,160 | 10/934,720 |
| 7,369,270 | 6,795,215 | 7,070,098 | 7,154,638 | 6,805,419 |
| 6,859,289 | 6,977,751 | 6,398,332 | 6,394,573 | 6,622,923 |
| 6,747,760 | 6,921,144 | 10/884,881 | 7,092,112 | 7,192,106 |
| 7,374,266 | 7,427,117 | 10/854,488 | 7,281,330 | 10/854,503 |
| 7,328,956 | 10/854,509 | 7,188,928 | 7,093,989 | 7,377,609 |
| 10/854,495 | 10/854,498 | 10/854,511 | 7,390,071 | 10/854,525 |
| 10/854,526 | 10/854,516 | 7,252,353 | 10/854,515 | 7,267,417 |
| 10/854,505 | 10/854,493 | 7,275,805 | 7,314,261 | 10/854,490 |
| 7,281,777 | 7,290,852 | 10/854,528 | 10/854,523 | 10/854,527 |
| 10/854,524 | 10/854,520 | 10/854,514 | 10/854,519 | 10/854,513 |
| 10/854,499 | 10/854,501 | 7,266,661 | 7,243,193 | 10/854,518 |
| 10/854,517 | 10/934,628 | | | |

BACKGROUND OF THE INVENTION

Printer units have traditionally been employed to interface with one or more associated computers to generate images based upon control data transmitted from the associated computers. The image quality and speed of image generation can vary considerably from printer unit to printer unit and is greatly dependant upon the type of printer unit employed. Generally speaking, the high speed printer units producing high resolution images at full colour are more expensive than printer units that produce single colour, black and white images at lower speeds. In this regard, the type of printer unit employed in a particular situation is generally selected upon consideration of the type of print images to be undertaken by the printer as well as the cost of the particular printer unit.

More recently, the roles of traditional printer units have been expanded to provide additional functions, particularly in an office environment. For example, many office printer units have been developed to provide conventional printing functions as well as providing functions normally associated with copier machines. In this regard, an image reading unit such as a document scanner is coupled with the printer unit to provide a printer unit with typical copy functions. Such multi-functional units have become popular due to the fact that they can achieve tasks that were previously performed by two or more separate units, thereby reducing the costs associated with maintaining two or more separate units and reducing the amount of space required to accommodate such units.

Unfortunately, such multifunctional units are typically rather dedicated units, and are generally targeted towards office use and as such are of a size and modularity that is rather restricted. Such units are also typically expensive, in terms of conventional printer units, and as such in order for such units to compete within the printer market, the printing units and/or the image reading units employed are generally of a lesser standard then competitively priced single units. Such a trade-off can typically result in a multifunctional unit operating at inferior printing speeds and print qualities. Further to this, typical multi-functional units do not readily provide a means for the various parts of the system to be mountable to each other to enable the individual parts of the multi-functional units to be separated or added onto. In this regard, due to the lack of modularity in the design of such multi-functional units it is not possible to purchase the printer unit and the image reading unit separately, such that a printer unit can be readily transformed into a multi-functional unit upon mounting the printer unit to an image reading unit.

SUMMARY OF THE INVENTION

In a first aspect the present invention provides an inkjet printer unit comprising:
  a media input assembly for supporting media for printing;
  a print engine for printing an image on the media; and,
  a media output assembly for collecting printed media, the media output assembly having an image reading unit with a surface for collecting the printed media; wherein,
  the print engine is between the media input assembly and the media output assembly such that in use the media output assembly rests flat on a support surface and the media input assembly extends upwardly from the print engine.

Optionally the media input assembly and the print engine are mounted on the image reader, and the image reader is configured to support the printer unit on a working surface.

Optionally the image reader extends outwardly from the print engine and the printed media is collected on an upper surface of the image reader.

Optionally the print engine comprises a media exit mechanism for ejecting said printed media from said print engine following printing.

Optionally the upper surface of the image reader is configured to capture said ejected printed media and to present the printed media for collection Optionally the upper surface of the image reader comprises a stop member which contacts with a leading edge of the ejected media to capture said ejected media on the upper surface of the image reader for collection.

Optionally the print engine comprises a pagewidth printhead having a plurality of ink ejection nozzles disposed thereon for ejecting ink onto a surface of the media as the media is transported past the printhead.

Optionally the printhead is provided on a cartridge and the cartridge is removable from the print engine.

Optionally the cartridge comprises at least one ink storage reservoir for storing ink for printing by said printhead.

Optionally the print engine comprises a cradle and the cradle is configured to receive the cartridge.

Optionally the cradle comprises a media transport mechanism for transporting said media from said media input assembly past said printhead for printing.

Optionally the cradle comprises a control system which controls the operation of the printhead and the transport mechanism to facilitate printing of said image on the media.

Optionally the control system also controls the operation of the image reading unit.

In a second aspect the present invention provides an inkjet printer unit comprising:
  a media input assembly for supporting media for printing;
  a print engine for printing an image on the media; and,
  a media output assembly for collecting printed media, the media output assembly having an image reading unit with a surface for collecting the printed media; wherein,
  the print engine has a pagewidth printhead.

Optionally the media input assembly and the print engine are mounted on the image reader, and the image reader is configured to support the printer unit on a working surface.

Optionally the image reader extends outwardly from the print engine and the printed media is collected on an upper surface of the image reader.

Optionally the print engine comprises a media exit mechanism for ejecting said printed media from said print engine following printing.

Optionally the upper surface of the image reader is configured to capture said ejected printed media and to present the printed media for collection Optionally the upper surface of the image reader comprises a stop member which contacts with a leading edge of the ejected media to capture said ejected media on the upper surface of the image reader for collection.

Optionally the print engine comprises a pagewidth printhead having a plurality of ink ejection nozzles disposed thereon for ejecting ink onto a surface of the media as the media is transported past the printhead.

Optionally the printhead is provided on a cartridge and the cartridge is removable from the print engine.

Optionally the cartridge comprises at least one ink storage reservoir for storing ink for printing by said printhead.

Optionally the print engine comprises a cradle and the cradle is configured to receive the cartridge.

Optionally the cradle comprises a media transport mechanism for transporting said media from said media input assembly past said printhead for printing.

Optionally the cradle comprises a control system which controls the operation of the printhead and the transport mechanism to facilitate printing of said image on the media.

Optionally the control system also controls the operation of the image reading unit.

In a third aspect the present invention provides an inkjet printer unit for use with an image reader, the printer unit comprising:
  a body having a media input assembly for supporting media to be printed, and securing means for releasable engagement with complementary securing means on the image reader; and,
  a print engine with a pagewidth printhead and a control system to control the operation of the printhead; wherein,
  the body is shaped for nesting with the image reader unit such that the securing means are positioned for releasable engagement with the complementary securing means.

Optionally the body has a base which is shaped to be received within a seat provided in the image reading unit.

Optionally the base of the body comprises a plurality of recess portions adapted to receive a plurality of locating members provided on the seat of the image reading unit to removably secure the body to the image reading unit.

Optionally the base of the body includes an electrical inlet for receiving an electrical connector provided on the seat of the image reading unit, such that when the body is secured to said image reading unit an electrical path is formed between the body and the image reading unit to enable data and power to be transferred therebetween.

Optionally the control system of the print engine controls the operation of the image reading unit and data is transferred between the control system and the image reading unit via the electrical path.

Optionally the body comprises a power source which supplies operating power to the image reading unit via the electrical path.

Optionally the printhead is provided on a cartridge and the cartridge is removable from the print engine.

Optionally the cartridge comprises at least one ink storage reservoir for storing ink for printing by said printhead.

Optionally the print engine comprises a cradle and the cradle is configured to receive the cartridge.

Optionally the cradle comprises a media transport mechanism for transporting said media from said media input assembly past said printhead for printing.

In a further aspect there is provided an image reader unit for use with an inkjet printer unit, the image reader unit comprising:
　　a media reading surface for receiving printed media from the printer unit and presenting the printed media for reading; and
　　complementary securing means for releasable engagement with securing means on the printer unit; wherein,
　　the image reader is shaped for nesting with the printer unit such that the complementary securing means are positioned for releasable engagement with the securing means.

In a further aspect there is provided an image processing apparatus for printing an image onto a media surface and for reading and recording image information associated with an image on a media surface, the apparatus comprising:
　　an inkjet printer unit having a media input assembly for supporting media to be printed;
　　a print engine with a pagewidth printhead and a control system to control the operation of the printhead; and,
　　an image reading unit having a media reading surface for receiving printed media from the printer unit and presenting the printed media for reading; wherein,
　　the inkjet printer unit nestingly engages with, and is releasably secured to, the image reader unit.

In a further aspect there is provided an image processing apparatus for printing an image onto a media surface and for reading and recording image information associated with an image on a media surface, the apparatus comprising:
　　an inkjet printer unit having a media input assembly for supporting media to be printed;
　　a print engine with a pagewidth printhead and a control system to control the operation of the printhead; and,
　　an image reading unit having a media reading surface for receiving printed media from the printer unit and presenting the printed media for reading; wherein,
　　the inkjet printer unit nestingly engages with, and is releasably secured to, the image reader unit.

In a further aspect there is provided an image processing apparatus for printing an image onto a media surface and for reading image information associated with an image on a media surface, the apparatus comprising:
　　an inkjet printer unit having a media input assembly for supporting media to be printed;
　　an image reading unit having an image reader and a media reading surface for receiving printed media and presenting the printed media for the image reader to read the image information; and,
　　a print engine with a pagewidth printhead and a control system to control the operation of the printhead, the printhead having a plurality of ink ejection nozzles for ejecting individual drops of ink onto the media to be printed; wherein,
　　the control system determines whether each of the nozzles ejects a drop of ink at a rate of at least 50 million determinations per second.

In a further aspect there is provided an image reading unit, wherein the body comprises a seat portion and the seat portion is shaped to receive the inkjet printer unit therein.

In a further aspect there is provided an image reading unit, wherein the securing means is provided on the seat portion and comprises at least one locating member extending from the seat portion and adapted to engage with a corresponding receiving member provided on the inkjet printer unit.

In a further aspect there is provided an image reading unit, wherein the receiving member is a recess and the locating member is shaped to be received within the recess.

In a further aspect there is provided an image reading unit, wherein an electrical connector is provided on the seat portion to contact with a corresponding electrical connector provided on the inkjet printer unit, such that when the inkjet printer unit is received in said seat portion an electrical path is formed between the inkjet printer unit and the image reader to enable data and power to be transferred therebetween.

In a further aspect there is provided an image reading unit, wherein the image reader comprises a head portion and the head portion is arranged to move along the surface of the media to collect the image information associated with the image formed on the surface of the media.

In a further aspect there is provided an image reading unit, wherein the image information collected by the image reader is stored within a controller provided with the image reader.

In a further aspect there is provided an image reading unit, wherein the image information stored within the controller is sent to the inkjet printer unit for processing via the electrical path.

In a further aspect there is provided an image reading unit, wherein the controller coordinates the operation of the image reading unit following control commands received from said inkjet printer unit.

In a further aspect there is provided an image processing apparatus for printing an image onto a media surface and for reading image information associated with an image on a media surface, the apparatus comprising:
　　an inkjet printer unit having a media input assembly for supporting media to be printed;
　　an image reading unit having an image reader and a media reading surface for receiving printed media and presenting the printed media for the image reader to read the image information; and,
　　a print engine with a pagewidth printhead and a control system to control the operation of the printhead; wherein,
　　the printhead has at least 5000 ink ejection nozzles for ejecting individual drops of ink onto the media.

In a further aspect there is provided an image reading unit, wherein the body comprises a seat portion and the seat portion is shaped to receive the inkjet printer unit therein.

In a further aspect there is provided an image reading unit, wherein the receiving member is a recess and the locating member is shaped to be received within the recess.

In a further aspect there is provided an image reading unit, wherein an electrical connector is provided on the seat portion to contact with a corresponding electrical connector provided on the inkjet printer unit, such that when the inkjet printer unit is received in said seat portion an electrical path is formed between the inkjet printer unit and the image reader to enable data and power to be transferred therebetween.

In a further aspect there is provided an image reading unit, wherein the image reader comprises a head portion and the head portion is arranged to move along the surface of the media to collect the image information associated with the image formed on the surface of the media.

In a further aspect there is provided an image reading unit, wherein the image information collected by the image reader is stored within a controller provided with the image reader.

In a further aspect there is provided an image reading unit, wherein the image information stored within the controller is sent to the inkjet printer unit for processing via the electrical path.

In a further aspect there is provided an image reading unit, wherein the controller coordinates the operation of the image reading unit following control commands received from said inkjet printer unit.

DETAILED DESCRIPTION OF PREFERRED EMBODIMENTS

Figure 1:
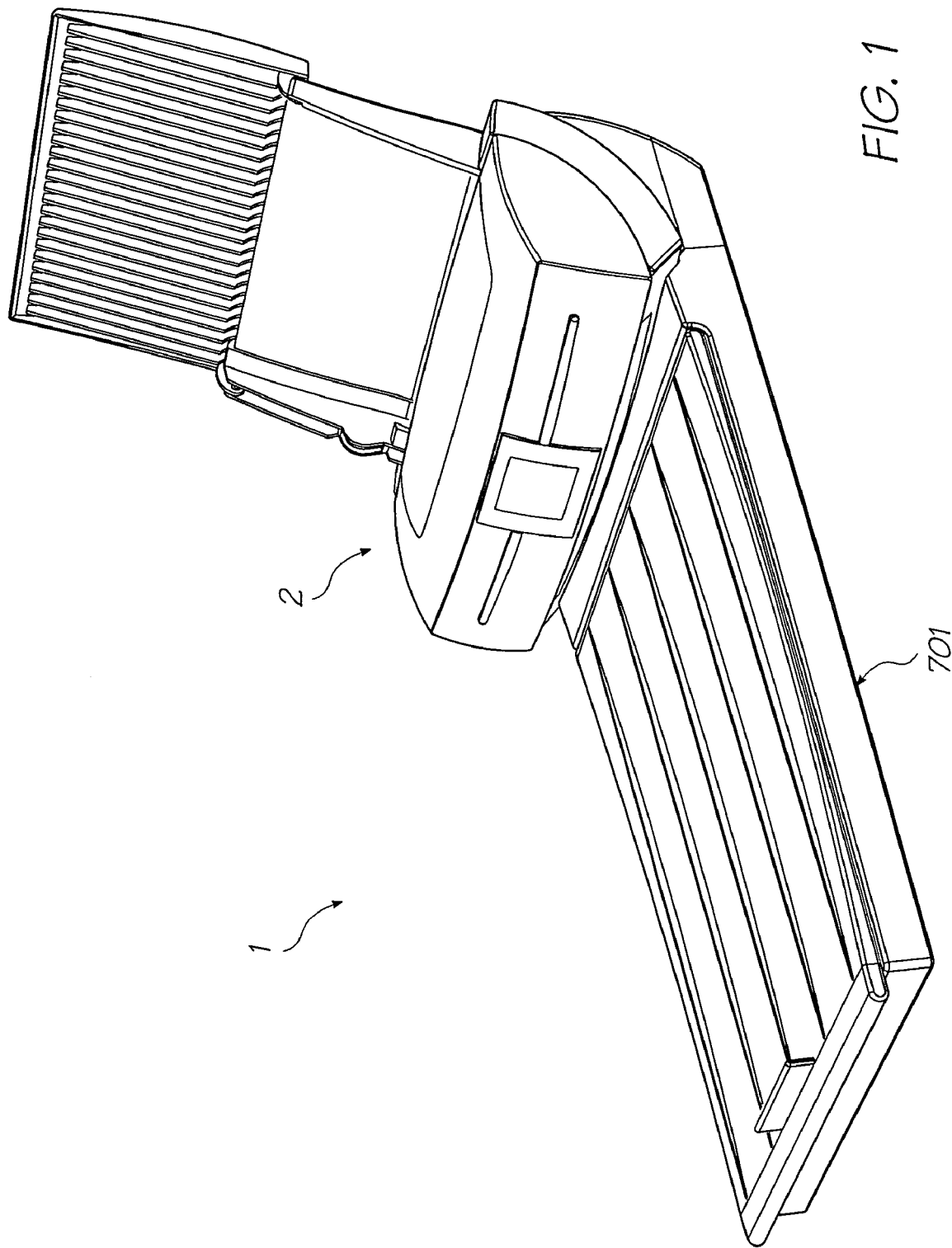
FIG. 1 shows a front perspective view of a multi-purpose image processing apparatus in accordance with an embodiment of the present invention.

As shown in FIG. 1, the present invention is embodied in a multi-purpose image processing apparatus 1 that is capable of both reading an image via an image reading unit 701 and printing an image via an inkjet printer unit 2. The image reading unit 701 may be in the form of a traditional flat bed scanner unit, and the apparatus 1 is configured such that the image reading unit 701 and the inkjet printer unit 2 are able to perform their individual tasks both in combination and in isolation. In this regard, the apparatus 1 can function as an image reading unit, an inkjet printer unit or as a copier unit whereby the image reading unit and the inkjet printer unit functions combine to print an image read by the image reading unit. The manner in which the apparatus is configured to provide such a multi-function system of operation will be described in more detail below.

As the image processing apparatus 1 of the present invention is made up of an inkjet printer unit 2 and an image reading unit 701, each of these units will firstly be described in isolation.

Inkjet Printer Unit

Figure 2:
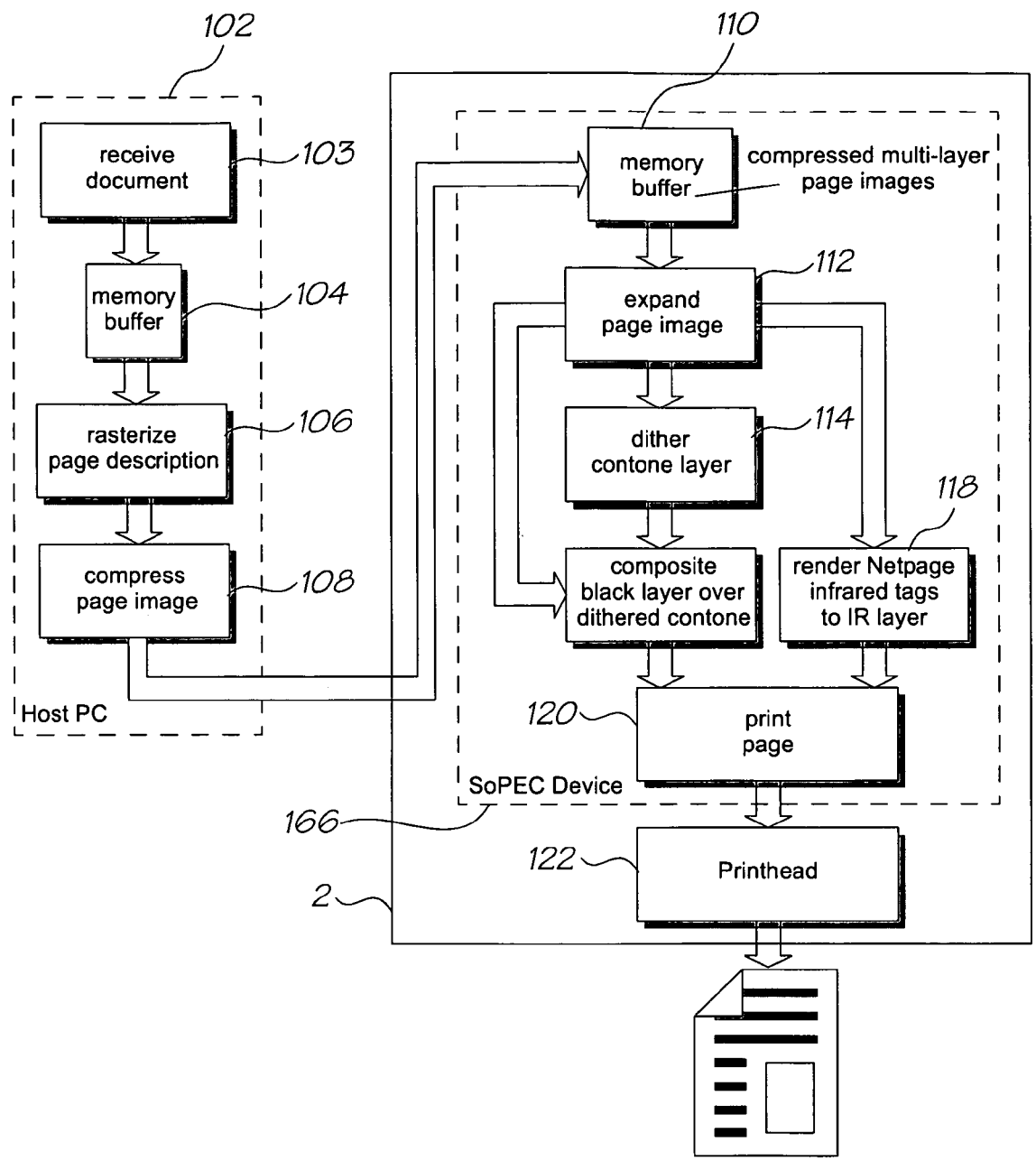
FIG. 2 shows a schematic of document data flow in a printing system incorporating the printer unit of the present invention.

As shown schematically in FIG. 2, in use, the printer unit 2 is arranged to print documents received from the scanning unit 95 or an external source, such as a computer system 102, onto a print media, such as a sheet of paper. In this regard, the printer unit 2 includes means which allow electrical connection between the unit 2 and the computer system 102, the manner in which will be described later, to receive data which has been pre-processed by the computer system 102. In one form, the external computer system 102 is programmed to perform various steps involved in printing a document, including receiving the document (step 103), buffering it (step 104) and rasterizing it (step 106), and then compressing it (step 108) for transmission to the printer unit 2.

According to one embodiment of the present invention, the printer unit 2 may receive a document from the external computer system 102 in the form of a compressed, multi-layer page image, wherein control electronics 72 provided within the printer unit 2 buffers the image (step 110), and then expands the image (step 112) for further processing. The expanded contone layer is dithered (step 114) and then the black layer from the expansion step is composited over the dithered contone layer (step 116). Coded data may also be rendered (step 118) to form an additional layer, to be printed (if desired) using an infrared ink that is substantially invisible to the human eye. The black, dithered contone and infrared layers are combined (step 120) to form a page that is supplied to a printhead for printing (step 122).

In this particular arrangement, the data associated with the document to be printed is divided into a high-resolution bi-level mask layer for text and line art and a medium-resolution contone color image layer for images or background colors. Optionally, colored text can be supported by the addition of a medium-to-high-resolution contone texture layer for texturing text and line art with color data taken from an image or from flat colors. The printing architecture generalises these contone layers by representing them in abstract "image" and "texture" layers which can refer to either image data or flat color data. This division of data into layers based on content follows the base mode Mixed Raster Content (MRC) mode as would be understood by a person skilled in the art. Like the MRC base mode, the printing architecture makes compromises in some cases when data to be printed overlap. In particular, in one form all overlaps are reduced to a 3-layer representation in a process (collision resolution) embodying the compromises explicitly.

Figure 3:
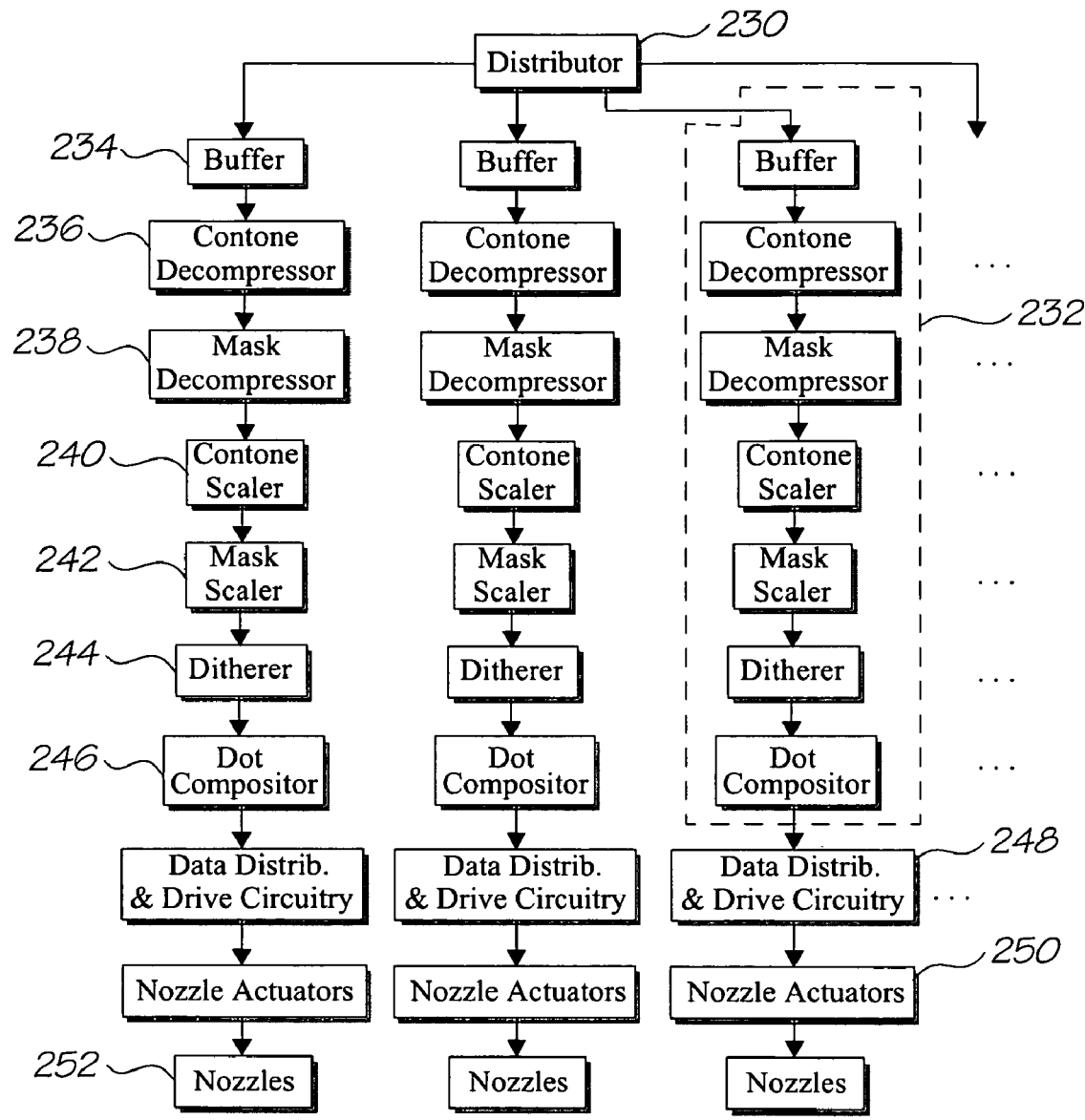
FIG. 3 shows a more detailed schematic showing an embodiment of the architecture used in the control system of the printer unit of the present invention.

As mentioned previously, data is delivered to the printer unit 2 in the form of a compressed, multi-layer page image with the pre-processing of the image performed by a mainly software-based computer system 102. In turn, the printer unit 2 processes this data using a mainly hardware-based system as is shown in more detail in FIG. 3.

Upon receiving the data, a distributor 230 converts the data from a proprietary representation into a hardware-specific representation and ensures that the data is sent to the correct hardware device whilst observing any constraints or requirements on data transmission to these devices. The distributor 230 distributes the converted data to an appropriate one of a plurality of pipelines 232. The pipelines are identical to each other, and in essence provide decompression, scaling and dot compositing functions to generate a set of printable dot outputs.

Each pipeline 232 includes a buffer 234 for receiving the data. A contone decompressor 236 decompresses the color contone planes, and a mask decompressor decompresses the monotone (text) layer. Contone and mask scalers 240 and 242 scale the decompressed contone and mask planes respectively, to take into account the size of the medium onto which the page is to be printed.

The scaled contone planes are then dithered by ditherer 244. In one form, a stochastic dispersed-dot dither is used. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be relatively free of objectionable low-frequency patterns when tiled across the image. As such, its size typically exceeds the minimum size required to support a particular number of intensity levels (e.g. 16×16×8 bits for 257 intensity levels).

The dithered planes are then composited in a dot compositor 246 on a dot-by-dot basis to provide dot data suitable for printing. This data is forwarded to data distribution and drive electronics 248, which in turn distributes the data to the correct nozzle actuators 250, which in turn cause ink to be ejected from the correct nozzles 252 at the correct time in a manner which will be described in more detail later in the description.

As will be appreciated, the components employed within the printer unit 2 to process the image for printing depend greatly upon the manner in which data is presented. In this regard it may be possible for the printer unit 2 to employ additional software and/or hardware components to perform more processing within the printer unit 2 thus reducing the reliance upon the computer system 102. Alternatively, the printer unit 2 may employ fewer software and/or hardware components to perform less processing thus relying upon the computer system 102 to process the image to a higher degree before transmitting the data to the printer unit 2.

Figure 4:
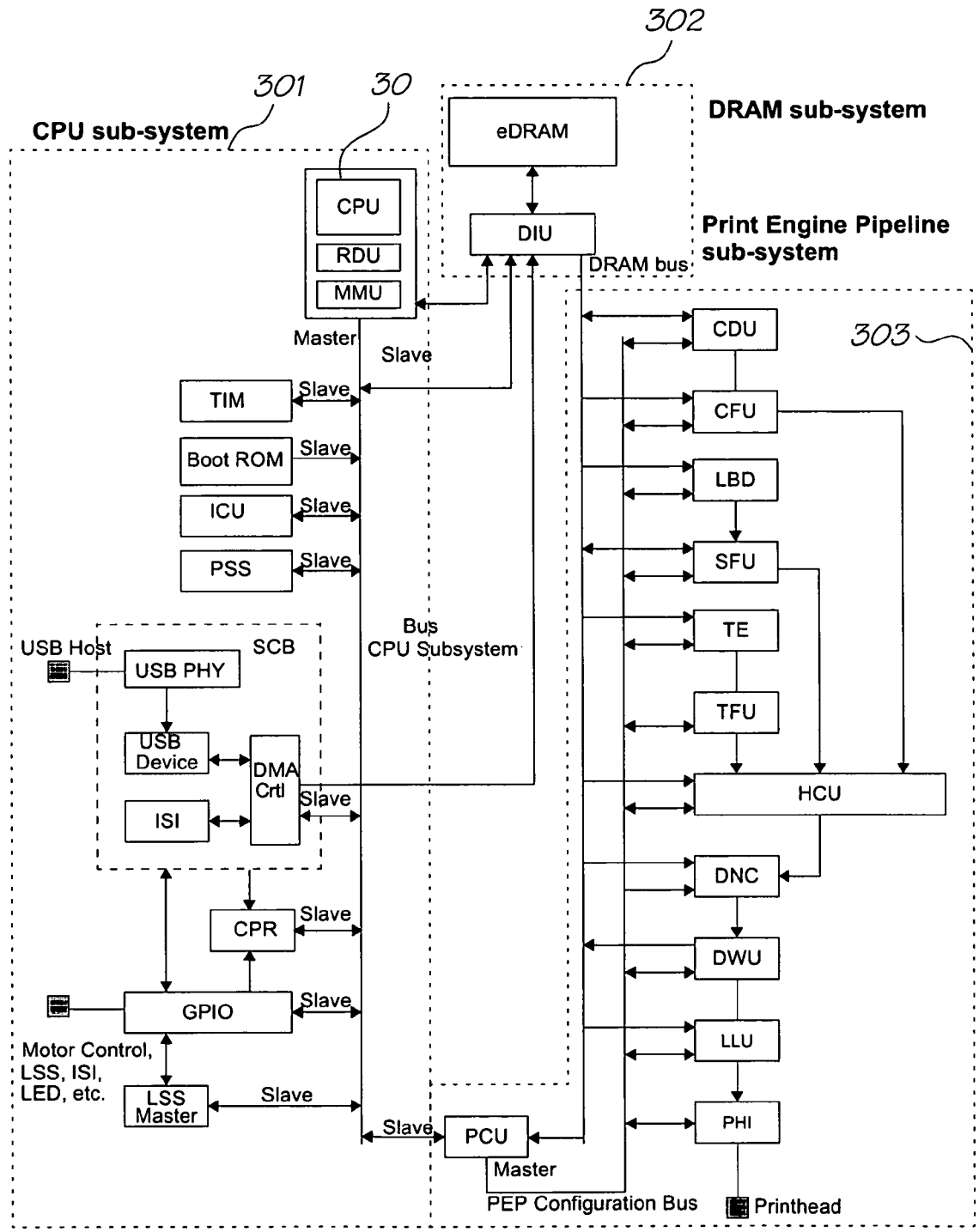
FIG. 4 shows a block diagram showing an embodiment of the control system used in the printer unit of the present invention.

In all situations, the components necessary to perform the above mentioned tasks are provided within the control electronics 72 of the printer unit 2, and FIG. 4 provides a block representation of an embodiment of such electronics.

In this arrangement, the hardware pipelines 232 are embodied in a Small Office Home Office Printer Engine Chip (SoPEC). As shown, a SoPEC device consists of 3 distinct subsystems: a Central Processing Unit (CPU) subsystem 301, a Dynamic Random Access Memory (DRAM) subsystem 302 and a Print Engine Pipeline (PEP) subsystem 303.

The CPU subsystem 301 includes a CPU 30 that controls and configures all aspects of the other subsystems. It provides general support for interfacing and synchronizing all elements of the printer unit 2, as will be described later. It also controls the low-speed communication to QA chips (which are described below). The CPU subsystem 301 also contains various peripherals to aid the CPU, such as General Purpose Input Output (GPIO, which includes motor control), an Interrupt Controller Unit (ICU), LSS Master and general timers. The Serial Communications Block (SCB) on the CPU subsystem provides a full speed USB 1.1 interface to the host as well as an Inter SoPEC Interface (ISI) to other SoPEC devices (not shown).

The DRAM subsystem 302 accepts requests from the CPU, Serial Communications Block (SCB) and blocks within the PEP subsystem. The DRAM subsystem 302, and in particular the DRAM Interface Unit (DIU), arbitrates the various requests and determines which request should win access to the DRAM. The DIU arbitrates based on configured parameters, to allow sufficient access to DRAM for all requesters. The DIU also hides the implementation specifics of the DRAM such as page size, number of banks and refresh rates.

The Print Engine Pipeline (PEP) subsystem 303 accepts compressed pages from DRAM and renders them to bi-level dots for a given print line destined for a printhead interface (PHI) that communicates directly with the printhead. The first stage of the page expansion pipeline is the Contone Decoder Unit (CDU), Lossless Bi-level Decoder (LBD) and, where required, Tag Encoder (TE). The CDU expands the JPEG-compressed contone (typically CMYK) layers, the LBD expands the compressed bi-level layer (typically K), and the TE encodes any Netpage tags for later rendering (typically in IR or K ink), in the event that the printer unit 2 has Netpage capabilities. The output from the first stage is a set of buffers: the Contone FIFO unit (CFU), the Spot FIFO Unit (SFU), and the Tag FIFO Unit (TFU). The CFU and SFU buffers are implemented in DRAM.

The second stage is the Halftone Compositor Unit (HCU), which dithers the contone layer and composites position tags and the bi-level spot layer over the resulting bi-level dithered layer.

A number of compositing options can be implemented, depending upon the printhead with which the SoPEC device is used. Up to 6 channels of bi-level data are produced from this stage, although not all channels may be present on the printhead. For example, the printhead may be CMY only, with K pushed into the CMY channels and IR ignored. Alternatively, any encoded tags may be printed in K if IR ink is not available (or for testing purposes).

In the third stage, a Dead Nozzle Compensator (DNC) compensates for dead nozzles in the printhead by color redundancy and error diffusing of dead nozzle data into surrounding dots.

The resultant bi-level 6 channel dot-data (typically CMYK, Infrared, Fixative) is buffered and written to a set of line buffers stored in DRAM via a Dotline Writer Unit (DWU).

Finally, the dot-data is loaded back from DRAM, and passed to the printhead interface via a dot FIFO. The dot FIFO accepts data from a Line Loader Unit (LLU) at the system clock rate (pclk), while the PrintHead Interface (PHI) removes data from the FIFO and sends it to the printhead at a rate of ⅔ times the system clock rate.

In the preferred form, the DRAM is 2.5 Mbytes in size, of which about 2 Mbytes are available for compressed page store data. A compressed page is received in two or more bands, with a number of bands stored in memory. As a band of the page is consumed by the PEP subsystem 303 for printing, a new band can be downloaded. The new band may be for the current page or the next page.

Using banding it is possible to begin printing a page before the complete compressed page is downloaded, but care must be taken to ensure that data is always available for printing or a buffer under-run may occur.

The embedded USB 1.1 device accepts compressed page data and control commands from the host PC, and facilitates the data transfer to either the DRAM (or to another SoPEC device in multi-SoPEC systems, as described below).

Multiple SoPEC devices can be used in alternative embodiments, and can perform different functions depending upon the particular implementation. For example, in some cases a SoPEC device can be used simply for its onboard DRAM, while another SoPEC device attends to the various decompression and formatting functions described above. This can reduce the chance of buffer under-run, which can happen in the event that the printer commences printing a page prior to all the data for that page being received and the rest of the data is not received in time. Adding an extra SoPEC device for its memory buffering capabilities doubles the amount of data that can be buffered, even if none of the other capabilities of the additional chip are utilized.

Each SoPEC system can have several quality assurance (QA) devices designed to cooperate with each other to ensure the quality of the printer mechanics, the quality of the ink supply so the printhead nozzles will not be damaged during prints, and the quality of the software to ensure printheads and mechanics are not damaged.

Normally, each printing SoPEC will have an associated printer QA, which stores information printer attributes such as maximum print speed. An ink cartridge for use with the system will also contain an ink QA chip, which stores cartridge information such as the amount of ink remaining. The printhead also has a QA chip, configured to act as a ROM (effectively as an EEPROM) that stores printhead-specific information such as dead nozzle mapping and printhead characteristics. The CPU in the SoPEC device can optionally load and run program code from a QA Chip that effectively acts as a serial EEPROM. Finally, the CPU in the SoPEC device runs a logical QA chip (ie, a software QA chip).

Usually, all QA chips in the system are physically identical, with only the contents of flash memory differentiating one from the other.

Each SoPEC device has two LSS system buses that can communicate with QA devices for system authentication and ink usage accounting. A large number of QA devices can be used per bus and their position in the system is unrestricted with the exception that printer QA and ink QA devices should be on separate LSS busses.

In use, the logical QA communicates with the ink QA to determine remaining ink. The reply from the ink QA is authenticated with reference to the printer QA. The verification from the printer QA is itself authenticated by the logical QA, thereby indirectly adding an additional authentication level to the reply from the ink QA.

Data passed between the QA chips, other than the printhead QA, is authenticated by way of digital signatures. In the preferred embodiment, HMAC-SHA1 authentication is used for data, and RSA is used for program code, although other schemes could be used instead.

As will be appreciated, the SoPEC device therefore controls the overall operation of the printer unit 2 and performs essential data processing tasks as well as synchronising and controlling the operation of the individual components of the printer unit 2 to facilitate print media handling. In the remainder of the description the term control electronics 72 will be used to refer to the SoPEC device and any other electronics which are employed within the printer unit 2 to control its operation.

Whilst the printer unit 2 is intended to be incorporated with a scanner unit 95 to form the image processing apparatus 1 of the present invention, for reasons of clarity the structure and operation of the printer unit 2 will be described with regard to its functionality as a stand-alone unit.

FIGS. 5-15 depict the inkjet printer unit 2 which generally comprises a main body 3, a media input assembly 4 for retaining and supporting print media for printing, and a media output assembly 5 for collecting the print media following printing.

Figure 6:
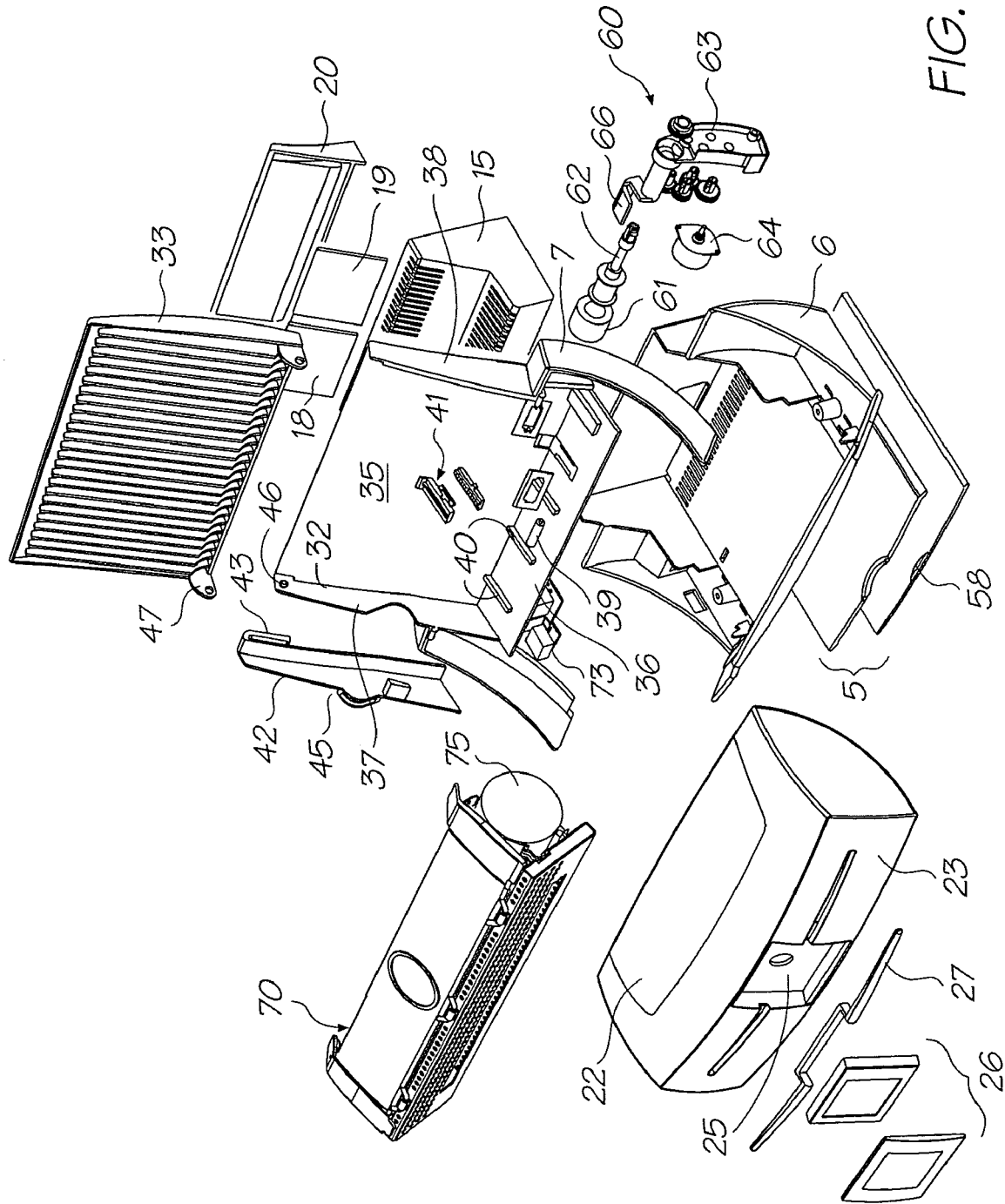
FIG. 6 shows an exploded front perspective view of the printer unit of FIG. 5.

As shown more clearly in FIG. 6, the structure of the main body 3 is formed by an upper frame unit 7 which is shaped to be received on a lower frame unit 6. The upper and lower frame units 7, 6 together define a base 8, a rear 9 and an opening 10 upon which a cover 11 is received. The opening 10 provides access to an internal cavity 12 which contains the print engine 70 and associated componentry.

Figure 11:
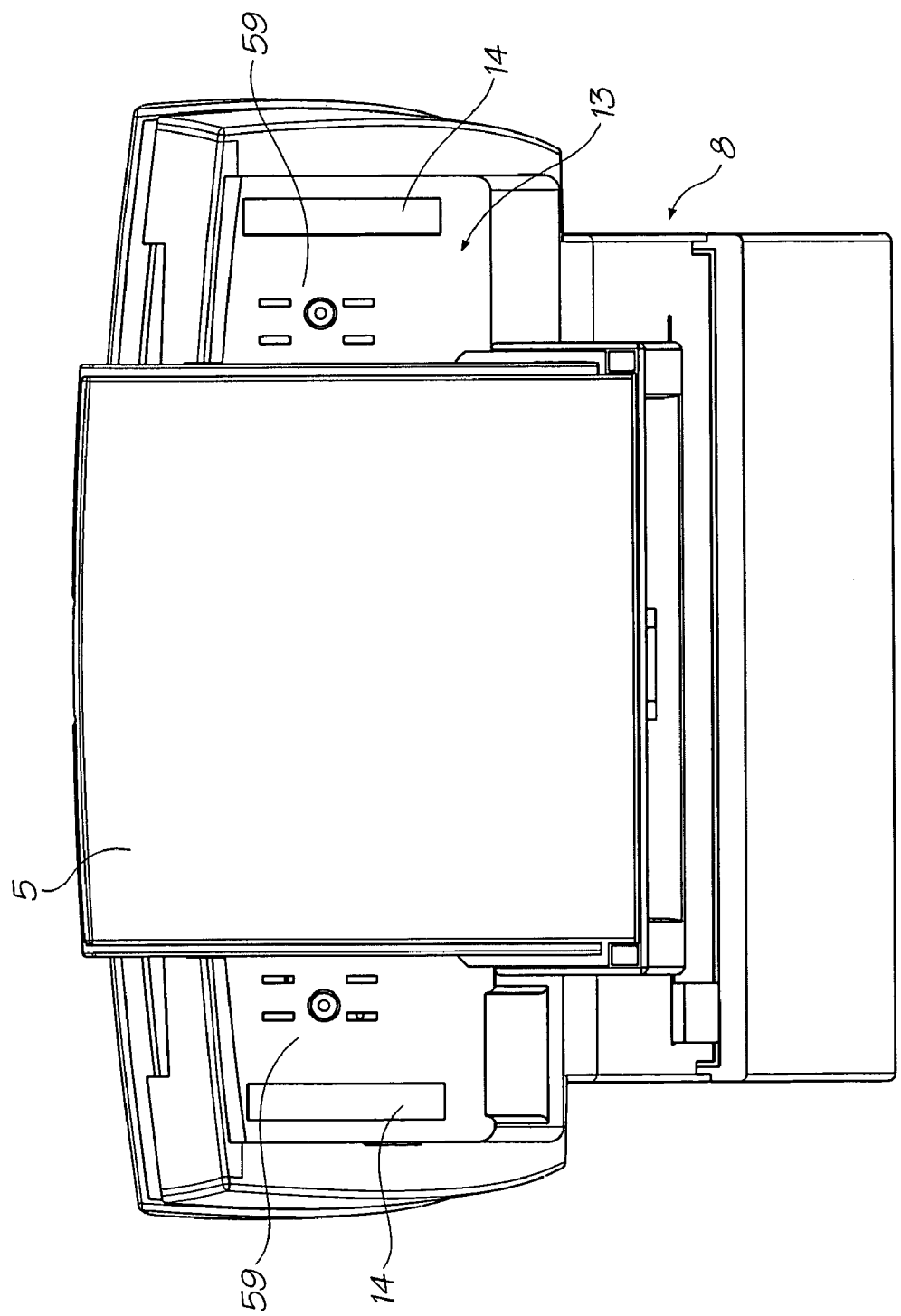
FIG. 11 shows a bottom plan view of the printer unit of FIG. 5.

As shown in FIG. 11, the base 8 is formed on the underside of the lower frame unit 6 and has a lower surface 13 that supports the printer unit 2 when the printer unit is used as a stand alone unit and positioned on a substantially horizontal surface, such as a surface of a desk in a home or office environment. In this arrangement, one or more foot supports 14 extend from the lower surface 13 to provide additional stability to the printer unit. The foot supports 14 are made from a friction inducing material such as rubber, to increase the frictional contact between the printer unit and the support surface. The manner in which the base 8 is configured to receive an image reading unit 701 will be described in more detail later in the description.

Figure 7:
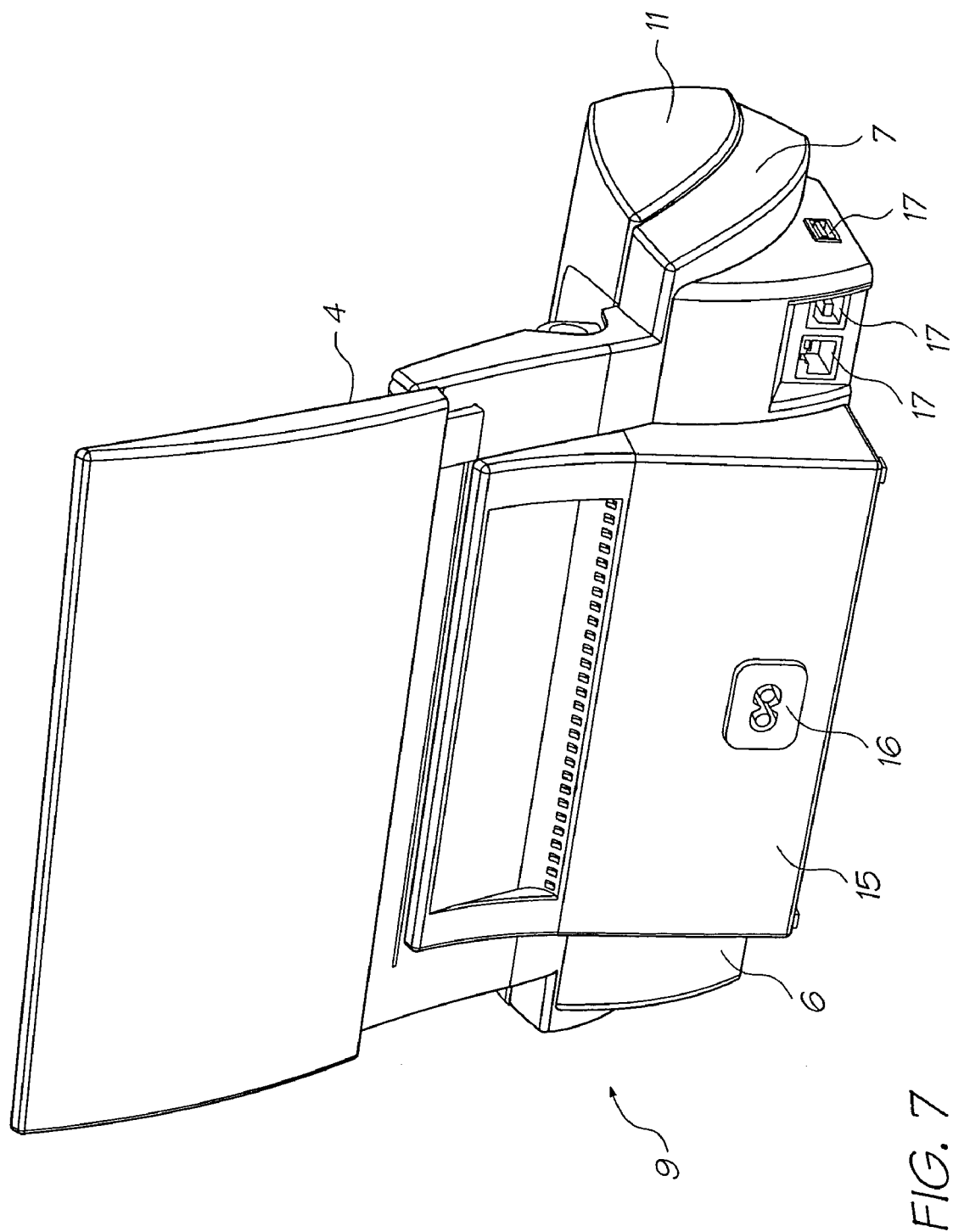
FIG. 7 shows a rear perspective view of the printer unit of FIG. 5.
Figure 8:
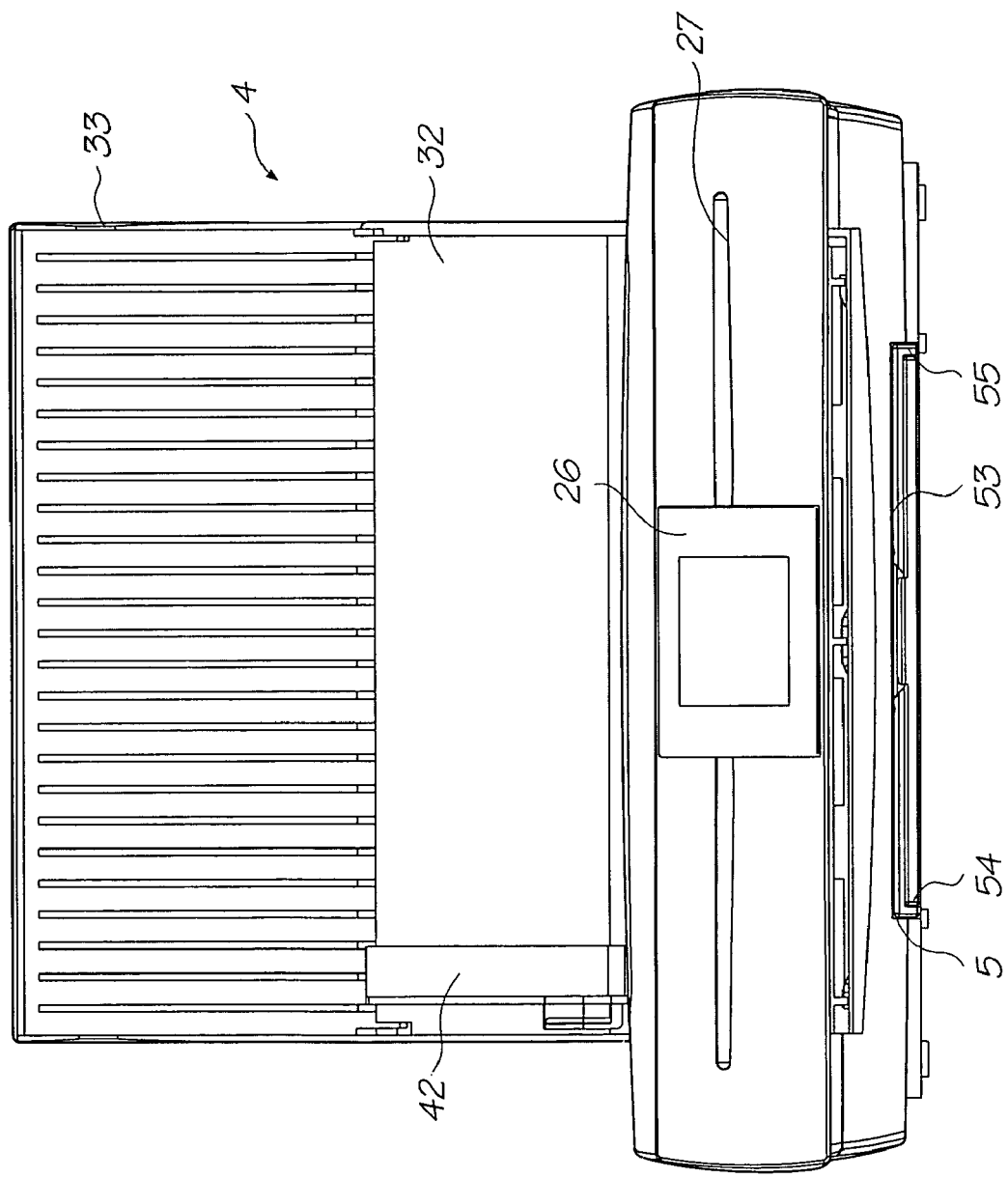
FIG. 8 shows a front plan view of the printer unit of FIG. 5.

As shown in FIG. 7, the rear 9 of the main body 3 is defined by the rear surface of the lower frame unit 6 and the upper frame unit 7. A power supply unit 15 is arranged to fit within a shaped recess in the lower frame unit 6, to be located adjacent the rear 9 of the main body 3. In one form, the power supply unit 15 is a fixed unit capable of receiving power via power connector socket 16 from an external power supply and supplying it to the various components of the unit. In another form, the power supply unit 15 may be of a rechargeable type capable of storing power for supply to the printer unit 2, and as such the unit 15 may be removable from the frame unit 6 for replacement where necessary. Data connector sockets 17 are also formed in the lower frame unit 6 and provide a means for connecting the printer unit 2 to an external source, such as a computer system 102, to provide data and commands to the printer unit 2 in the manner as previously described. The data connector sockets 17 are in the form of standard ethernet and USB Device sockets which enable the printer unit 2 to be connected to the computer terminal 102 or a network of computer terminals to receive data and commands therefrom. Such information may also be received by the printer unit 2 in a wireless manner by using a WIFI card 18 and/or a Bluetooth® card 19 provided under a cover plate 20 on the rear surface of the upper frame unit 7. In each of these arrangements, all data received is transmitted from the sockets 17 and cards 18, 19 to the control system of the printer unit 2 for processing and printing.

As is shown in FIGS. 5, 6, 8-10 and 13, the cover 11 of the main body 3 comprises a lid 21 hingedly connected to the upper frame unit 7. The lid 21 has a curved top surface 22 and an angled front surface 23 and two end surfaces 24 which are shaped to mate with the upper edge of the upper frame unit 7. The lid 21 is pivotally connected along a rear edge of the top surface 22 with the upper frame unit 7. This pivotal connection allows the lid 21 to be pivoted backwards to provide access to the internal cavity 12 of the main body 3.

The angled front surface 23 has a recess 25 formed therein. The recess 25 receives a user interface unit 26 that enables communication between a user and the printer unit 2. The user interface unit 26 is an LCD touch screen that conveys information to the user and allows the user to directly input information to the printer unit 2 via selecting an option on the display screen. The type of information which the user interface unit 26 may display to the user and which the user may input into the printer unit can vary, however typically this can relate to the status of the ink stored in the printer unit 2, the need to correct any paper jams or the like, as well as information relating to the ink refilling procedure. The use of a touch screen LCD is particularly beneficial as a user interface, as the display can be programmed to a specific language thereby overcoming the need to provide separate markings or text on the printer unit 2 which may be specific to the country to which the printer unit is to be used. However, it should be appreciated that the user interface unit 26 could be in a number of different forms, such as conventional buttons and the like, which allow the user to interact with the printer unit 2.

The angled front surface 23 of the lid 21 is also provided with a visual indicator unit 27 which provides the user with a visual indication of the status of the printer. The visual indicator unit 27 extends along the surface of the lid 21 and is in the form of an elongated tube or panel 28 which emits light from a light source 29. The colour and/or intensity of the light emitted from the visual indicator unit 27 can be controlled in a manner that provides the user with an instant indication of the state of the printer unit 2 without the need to refer to the user interface unit 26.

Figure 15A:
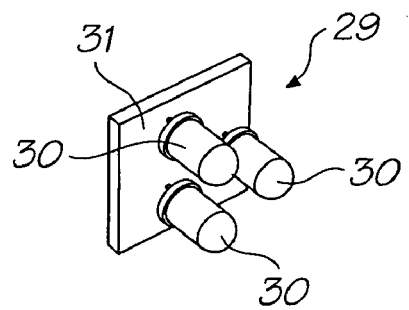
FIGS. 15a and 15b show a front perspective view of the light source and the tube of the visual indicator unit respectively.
Figure 15B:
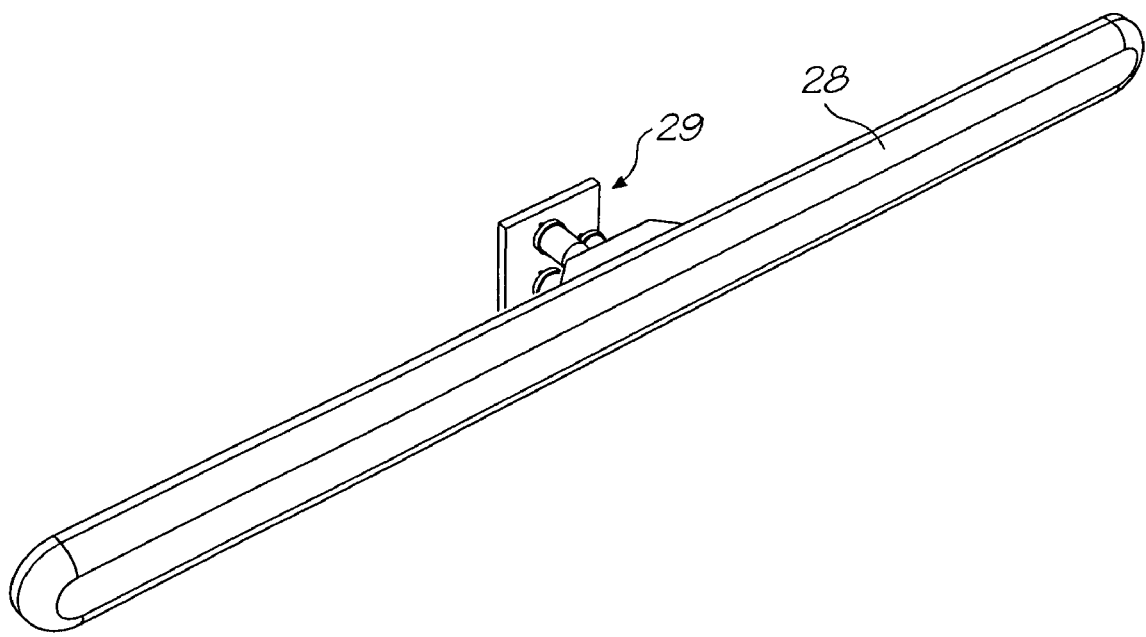

The construction of the visual indicator unit 27 is shown in FIGS. 15*a* and 15*b*. As shown, the unit 27 consists of a light source 29 and an elongate panel 28. The light source 29 is in the form of three light emitting diodes (LEDs) 30 arranged upon the surface of a printed circuit board (PCB) 31. The LEDs 30 are red, green and blue LEDs which allow a wide spectrum of light to be emitted from the panel 28. However it will be appreciated that a single LED or other colored LEDs could also be employed to perform a similar function. The PCB 31 may be the same PCB that contains the control electronics 72 for the printer unit 2 or may be a separate PCB that includes appropriate electronics to operate the LEDs 30 under control of the control electronics 72. The elongate panel 28 is made from a material that allows light from the LEDs 30 to travel along its length and to be transmitted from the surface of the panel. The panel 28 may be in the form of a hollow tube or pipe that is placed over the LEDs 30 to collect light emitted therefrom. The internal surface of the tube or pipe may be coated with a film that enables a portion of the light to be reflected along the length of the panel 28, and a portion of light to pass from the panel 28 thereby illuminating the panel 28 which can be readily seen by the user along the surface of the panel 28.

In use, each of the LEDs 30 can be controlled to emit a light from the panel 28 representative of the state of the printer unit 2. For example, to indicate to the user that the printer unit is in a standby mode a blue LED may be activated such that the panel 28 emits a blue light. During printing a green LED may be activated to emit a green light from the panel 28 and in the event of a problem such as a paper jam or a printer error, a red LED may be activated to emit a red light from the panel 28. Additionally, in order to create a decorative effect, each of the LEDs may be actuated in various combinations to emit a variety of coloured lights across a wide spectrum. As the light is emitted over a large surface area, rather then merely at a point source as is the case with a single LED provided on a printer unit, the user is more likely to visually detect the state of the printer and to attend to the printer where necessary. Such a system performs an important function in ensuring an efficient workplace and also provides a printer unit which is aesthetically pleasing.

To supply print media to the printer unit 2 for printing, the media input assembly 4 extends from the rear 9 of the printer unit 2. The media input assembly 4 consists of a tray portion 32 and a media support flap 33 which together form a surface for receiving one or more sheets of print media 34 for printing by the printer unit 2. The media input assembly 4 extends in a vertical direction from the main body 3 and is angled such that in use, the sheets of print media 34 are supported by the media input assembly 4 in a vertical orientation and are drawn into the printer via a downward path, as is shown in FIG. 14 and discussed in more detail later.

As shown more clearly in FIG. 6, the tray portion 32 of the media input assembly 4 is formed integrally with the upper frame unit 7, and as such the rear surface of the tray portion 32 forms part of the rear 9 of the main body 3. The tray portion 32 generally forms a receptacle for receiving the print media 34 and includes a working surface 35 upon which the media 34 is placed, and a media support surface 36 at one end thereof adapted to receive an edge of the media 34 to maintain the media 34 in an upright position. The tray portion 32 also includes a pair of parallel extending side walls 37, 38 which define the maximum width of the print media that can be accommodated by the printer unit 2.

Figure 14:
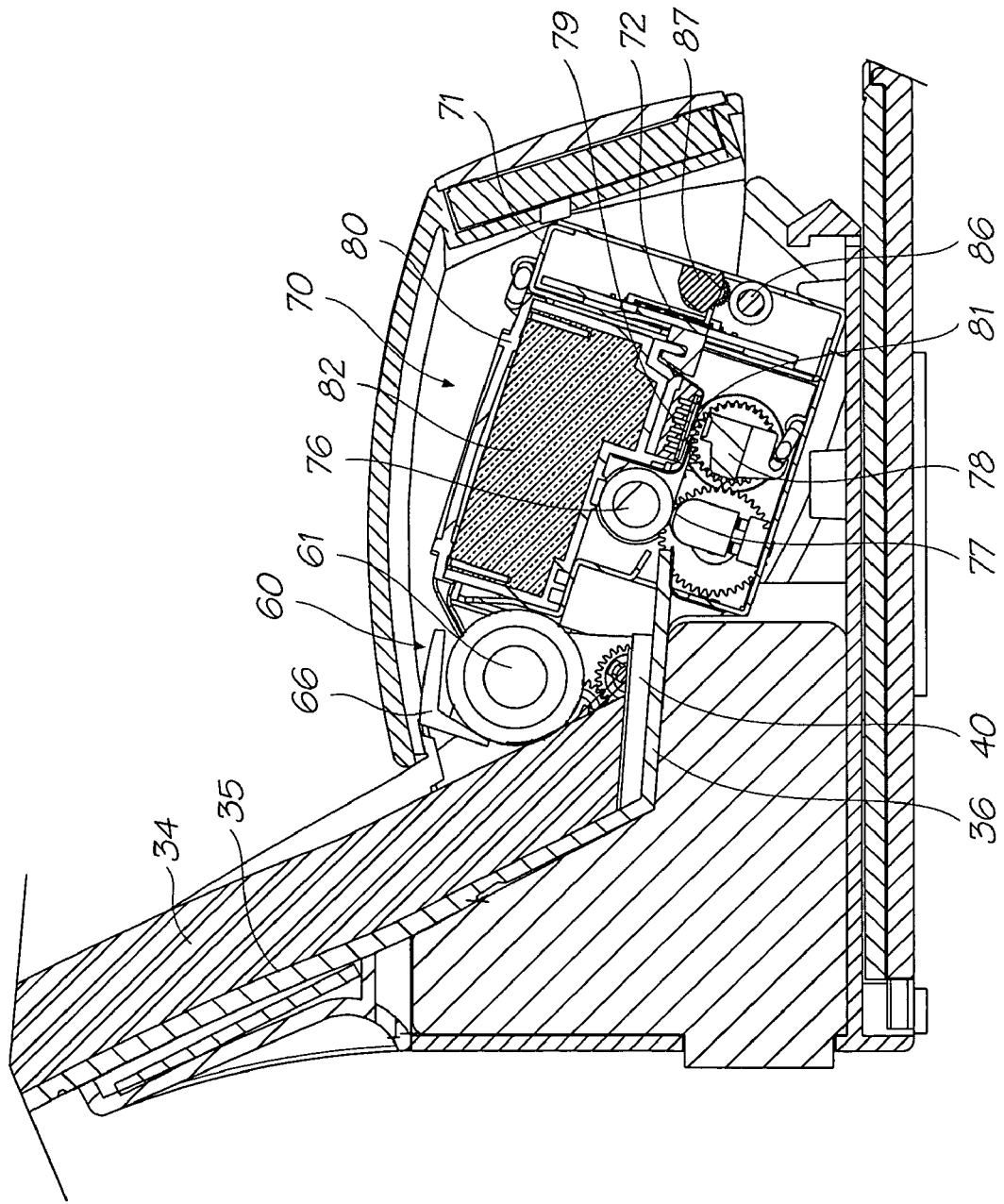
FIG. 14 shows a sectional side view of the printer unit of FIG. 5.

As is shown more clearly in FIG. 14, the media support surface 36 is disposed at an obtuse angle to the working surface 35 of the tray portion 32, to aid in the delivery of a sheet of print media 34 from the tray portion 32 to the print engine 70 for printing. The working surface 35 has an idler roller 39 incorporated therein to act with a picker mechanism 60 to facilitate the delivery of a sheet of print media 34 from the working surface 35 to the print engine 70 for printing. Disposed at intervals along the media support surface 36 are a number of raised strips 40 which extend from the media support surface 36 and support the leading edge of the media 34 above the surface 36. The strips 40 act to allow the leading edge of the media 34 to slide along the surface of the strips 40 under action of the picker mechanism 60 to facilitate delivery of the media 34 from the tray portion 32. A pad 41 is provided on the surface of the strip 40 adjacent the picker mechanism 60 to provide a friction surface to facilitate separation of the upper most sheet of media 10 when a plurality of sheets are supported upon the working surface 35 of the tray portion 32. The pad 41 may be in the form of a rubber, felt or cork type material.

A margin slider 42 is adapted to be fitted over the working surface 35 of the tray portion 32 via an integral hook element 43. A grooved recess (not shown) may be provided in the working surface 35 to receive a locating lug (not shown) of the slider 42 to maintain the slider 42 in engagement with the working surface 35. Such an arrangement allows the slider 42 to be moved in a controlled manner across the surface 35 to accommodate print media 34 of varying widths. The margin slider 42 extends the height of the tray portion 32 and is provided with a wall portion 45 that extends out from the working surface 35 of the tray portion 32 to abut against a side edge of the print media 34. This arrangement ensures that the print media 34 is properly aligned within the tray portion 32 to ensure controlled delivery of the sheets of media to the print engine 70.

Figure 5:
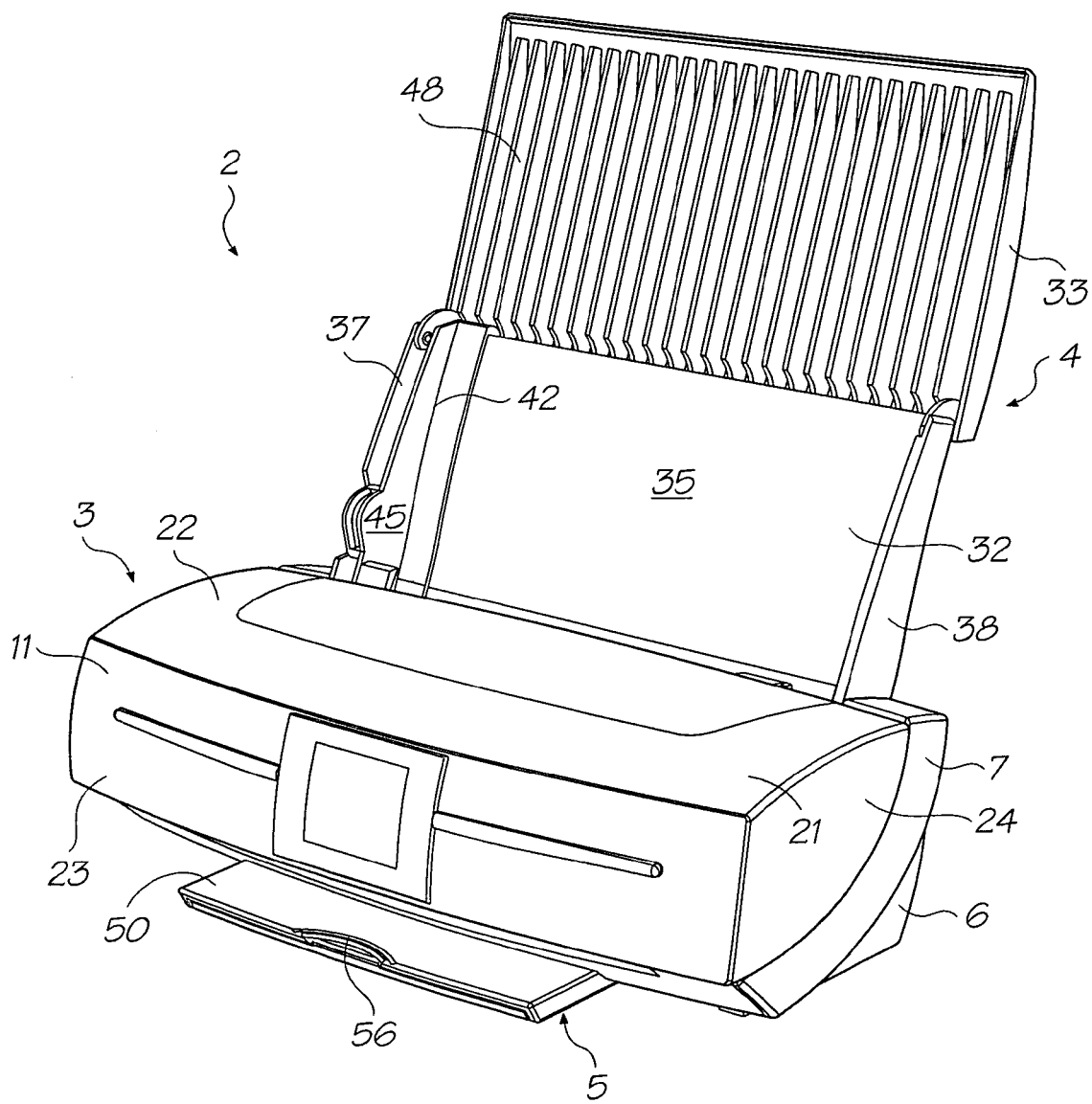
FIG. 5 shows a front perspective view of the printer unit of the present invention.

As shown in FIG. 6, the side walls 37, 38 of the tray portion 32 are provided with locating lugs 46 on the inner surfaces thereof to enable the media support flap 33 to be connected to the tray portion 32. In this regard, the media support flap 33 includes a pair of recessed tabs 47 extending from an end thereof that receives the lugs 46 thereby securing the media support flap 33 to the upper end of tray portion 32. With this arrangement, the media support flap 33 can pivot about the distal end of the tray portion 32 such that the flap 33 can be moved to an extended position to support print media 34 loaded onto the media input assembly 4 (as shown in FIG. 5), or into a retracted position for packaging or shipment, wherein the media support flap 33 is received on top of the tray portion 32 (not shown).

Figure 12:
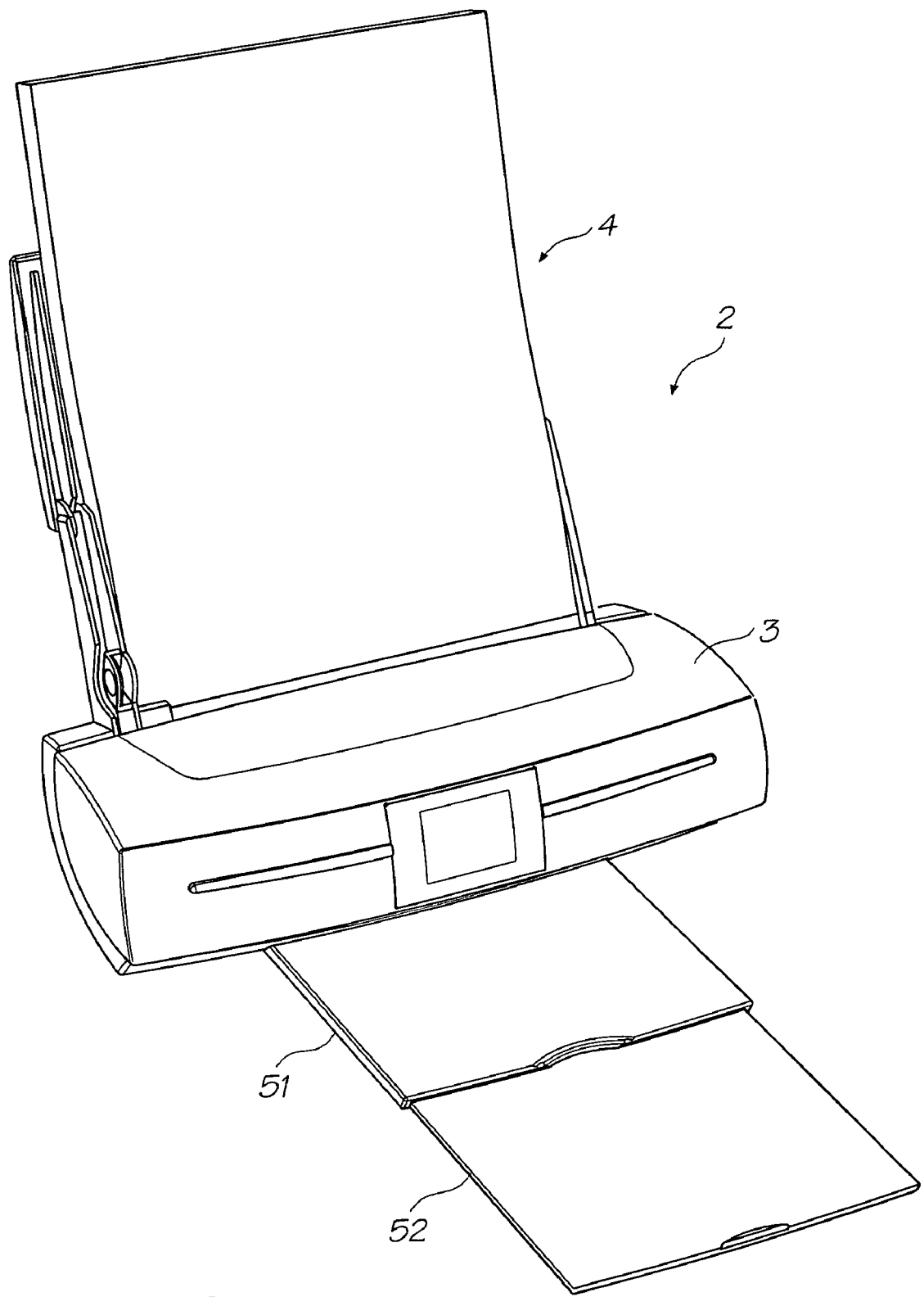
FIG. 12 shows a front perspective view of the printer unit of FIG. 5 with the media output assembly extended and media loaded in the media input assembly.

The media support flap 33 extends beyond the distal end of the tray portion 32 to support print media 34 having a length greater than the length of the tray portion 32. This arrangement ensures that the print media 34 is maintained in a substantially upright position, as shown in FIG. 12. In this regard, the surface of the media support flap 33 is provided with a plurality of equispaced fin elements 48 that extending longitudinally along the surface of the flap 33. Each of the fin elements 48 extend from the surface of the media support flap 35 an equal amount to thereby present a flat surface to the print media 34 which is continuous with the working surface 35 of the tray portion 32. It is envisaged that the inner surface of the media support flap 33 could also be a continuous moulded surface with appropriate slots formed in edge regions thereof to accommodate the side walls 37, 38 of the tray portion 32, when the media support flap 33 is folded for packaging or transport of the printer unit 2.

As a stand-alone unit, the printer unit 2 is adapted to collect printed media via the media output assembly 5, as shown in FIG. 12. In this arrangement, the media output assembly 5 is positioned in the base 8 of the main body 3 at the front of the printer unit 2. The media output assembly 5 consists of a tray housing 50 and two extendible output trays, an upper output tray 51 and a lower output tray 52, both of which are retained within the tray housing 50 when not in an extended position.

As shown in FIGS. 6 and 11, the tray housing 50 is removably received within a recess in the lower frame unit 6, and extends from the rear to marginally beyond the front of the printer unit 2. The tray housing 50 has an upper surface 53 and two side walls 54, 55 extending downwardly from the upper surface 53. The front edge of the upper surface 53 is open and has a recessed portion 56 formed therein to enable access to the upper and lower output trays 51, 52 retained within the tray housing 50.

The upper output tray 51 is shaped to be received and retained within the tray housing 50 by the two side walls 54, 55. The two side walls 54, 55 have grooves (not shown) provided therein that extend the length of the tray housing 50. The upper output tray 51 is sized to be received within the grooves such that its longitudinal edges travel within the grooves to allow the tray 51 to move relative to the tray housing 50. The grooves and the longitudinal edges of the upper output tray 51 are arranged such that the tray 51 is extendible from the tray housing 50, but is not removable from the tray housing 50. In this arrangement the tray 51 when in its retracted position, fits entirely within the tray housing 50.

Figure 9:
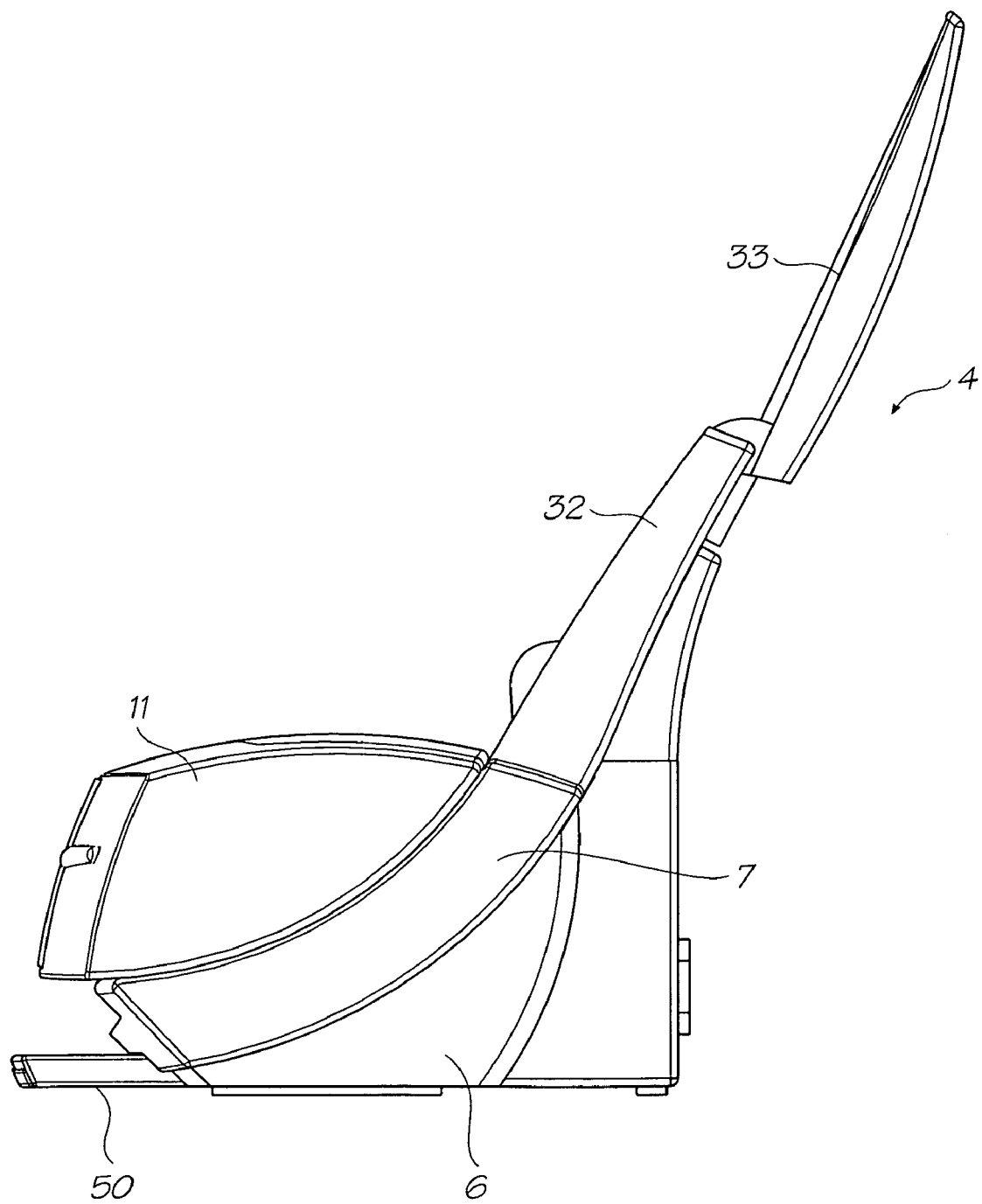
FIG. 9 shows a right side plan view of the printer unit of FIG. 5.
Figure 10:
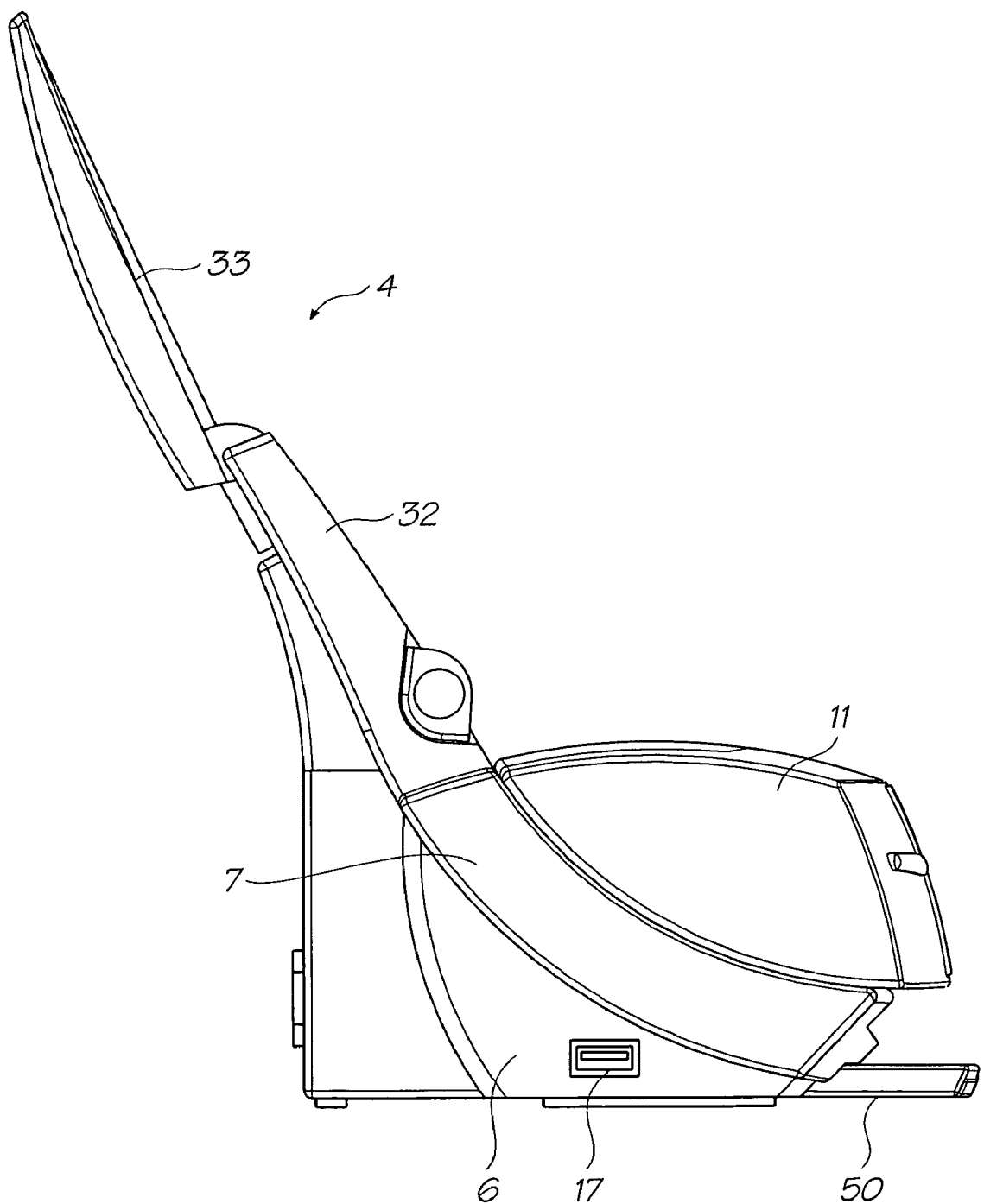
FIG. 10 shows a left side plan view of the printer unit of FIG. 5.

The lower output tray 52 is constructed in a similar manner to the upper output tray 51. However in this arrangement, the lower output tray 52 is received within two grooves provided in the longitudinal edges of the upper output tray 51. As is shown in FIG. 9, the lower output tray 52 has a reduced width and thickness than the upper output tray 51 to allow the lower tray 52 to travel within the upper tray. The lower output tray 52 is arranged to fit entirely within the upper output tray 51 in a retracted state and the upper output tray 51 is also provided with a recessed portion 57 along its front edge thereof to enable access to a stop member 58 provided on the front edge of the lower output tray 52. The lower output tray 52 and the upper output tray 51 may also be configured in a manner which allows the lower tray 52 to be extended from the upper tray 51 but prevented from being removed from the upper tray, in a similar manner as described above. Other arrangements of the trays which permit retraction and extension are also possible and would be considered to fall within the scope of the present invention.

Prior to use, the media output assembly 5 is in a retracted state as shown in FIG. 5. The media output assembly 5 is brought into an operational position, as shown in FIG. 12, when a user grips the stop member 58 and extends the lower output tray 52. This action causes the entire media output assembly 5 to extend from the tray housing 50 to capture the printed media ejected from the printer unit 2. The leading edge of the printed media is captured upon contacting the stop member 58 of the lower output tray 52 following exiting the main body 3. The amount by which the media output assembly 5 is extended is dependant upon the size of the media being printed. For example, if the print media is of a length such as that shown in FIG. 12, such as A4 sized media, then the print media assembly 5 may need to be fully extended in order to capture and retain the printed media.

As will be appreciated, the media output assembly 5 is removable from the printer unit 2 and is only employed when the printer unit 2 is used solely as an inkjet printer and not as part of the image processing apparatus 1. The manner in which the image processing apparatus is configured will be described in more detail below.

Figure 13:
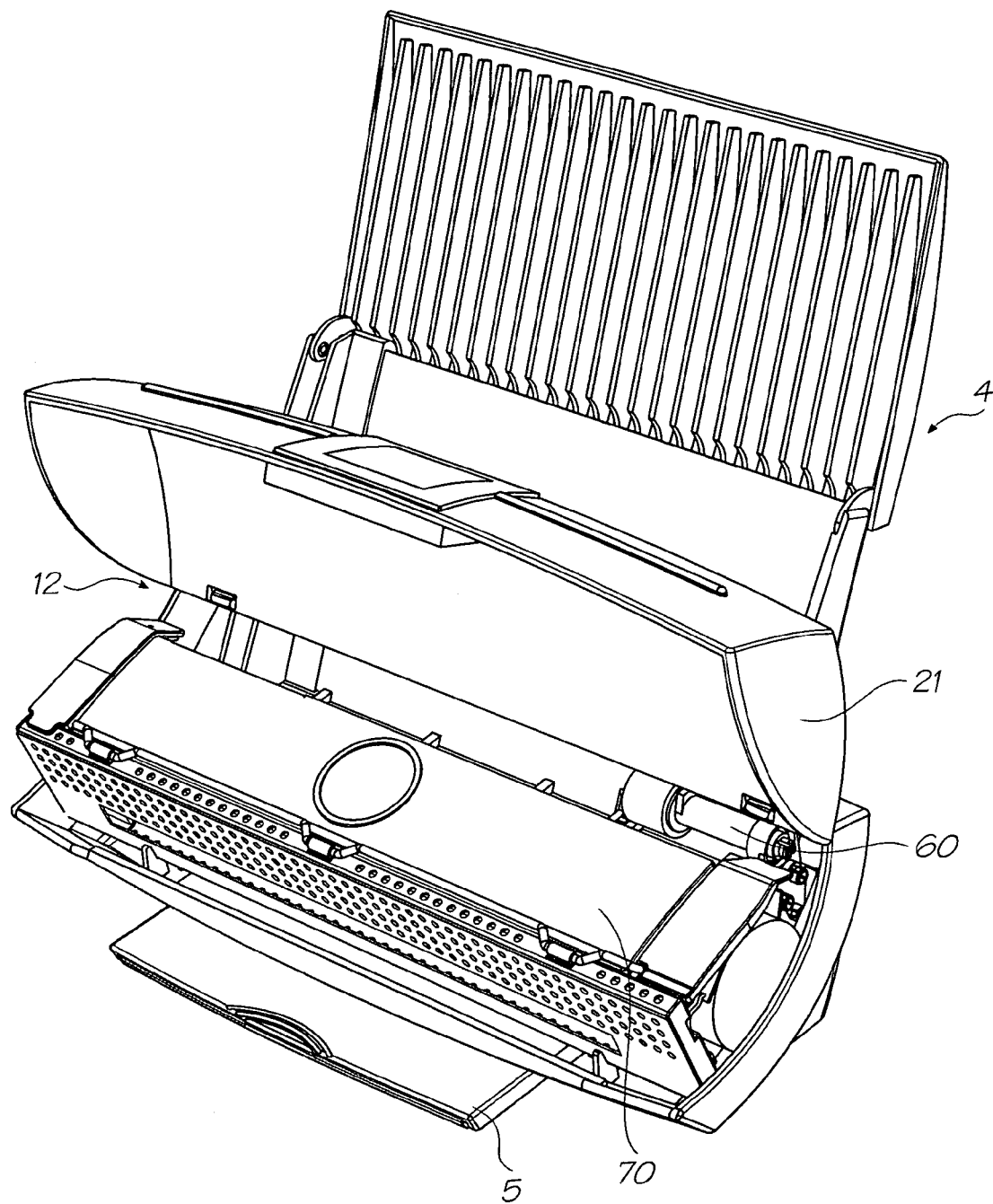
FIG. 13 shows a front perspective view of the printer unit of FIG. 5 with the cover of the printer unit open exposing the print engine.

As is shown in FIG. 13, and as mentioned previously, access to the internal cavity 12 of the main body 3 is possible by pivoting the lid 21 of the cover 11 backwards. The internal cavity 12 receives the print engine 70 as well as the paper handling mechanisms in the form of a picker mechanism 60.

As alluded to previously, the purpose of the picker mechanism 60 is to separate and transport single sheets of print media from the media input assembly 4 for delivery to the print engine 70 for printing. As the printer unit 2 can operate at speeds up to, and in excess of, 60 ppm the picker unit is configured to separate and transport sheets of print media to the print engine 70 at a rate suitable for achieving these printing speeds. As such, the picker mechanism 60 consists of a picker roller 61 which is disposed at the end of an arm 62 that extends from the picker body 63. The picker body 63 contains a motor 64 which is controlled by the control electronics 72 of the printer unit 2. The picker body 63 is pivotally mounted to the lower frame unit 6 and is spring loaded such that the picker roller 61 is urged towards the working surface 35 of the tray portion 32.

In the absence of print media 34 in the tray portion 32, the picker roller 61 is urged into contact with the idler roller 39 provided on the working surface 35 of the tray portion 32. In order to load print media into the tray portion 32, media 34 is inserted into the tray portion 32 and contacts a guide element 66 provided over the picker roller 61. This contact causes the picker mechanism 60 to pivot away from the working surface 35 of the tray portion 32, and allows the print media to be received between the picker roller 61 and the idler roller 39, with the leading edge of the print media 34 supported on the media support surface 36. This arrangement is shown in FIG. 14.

The surface of the picker roller 61 is provided with a gripping means, which may be in the form of a rubber coating or other similar type coating or surface treatment which facilitates gripping of the roller to a sheet of print media 34. As the picker roller 61 rotates, under action of the motor 64, the sheet of print media in contact with the picker roller 61 is caused to slide along the raised strips 40 for delivery to the print engine 70. The outermost sheet is separated from the other sheets present in the tray portion 32 due to the pad 41 provided on the surface of the strip 40 adjacent the picker mechanism 60. In this regard, any sheets of media that move with the outermost sheet will experience a friction force as they slide over the pad 41 which is greater than the friction force causing the motion, and as such only the outermost sheet will be delivered to the print engine 70.

It will be appreciated that the picker mechanism 60 is employed to separate the print media 34 and to transport individual sheets of print media, at relatively high speeds, to the print engine 70 for printing and as such the type of picker mechanism 60 employed to perform this function could vary and still fall within the scope of the present invention.

The print engine assembly 70 employed by the present invention is generally comprised of two parts: a cradle unit 71 and a cartridge unit 80. In this arrangement, the cartridge unit 80 is arranged to be received within the cradle unit 71.

As shown in FIG. 14, the cartridge unit 80 has a body that houses a printhead integrated circuit 81 for printing on a sheet of print media 34 as it passes thereby. The body of the cartridge unit 80 also houses ink handling and storage reservoirs 82 for storing and delivering ink to the printhead integrated circuit 81. The printhead integrated circuit 81 is a pagewidth printhead integrated circuit that is disposed along the outside of the body of the cartridge in a region below the ink handling and storage reservoirs 82 to extend the width of the media 34 being printed. As opposed to conventional printer units, the printhead integrated circuit 81 of the present invention is fixed in position during operation and does not scan or traverse across the print media. As such the print engine of the present invention is able to achieve far higher printing speeds than is currently possible with conventional printer systems. The manner in which the printhead integrated circuit 81 is configured and controlled will be discussed in more detail later in the description.

Power and data signals are provided from the control electronics 72 located on the cradle unit 71 to control the operation of the printhead integrated circuit 81. The control electronics 72 includes the previously described SoPEC device and signals are transmitted from the control electronics 72 to the cartridge unit 80 via data and power connectors (not shown) provided on the periphery of the body of the cartridge unit 80. Upon inserting the cartridge unit 80 into the cradle unit 71, the data and power connectors mate with corresponding data and power connectors provided on the cradle unit 71, thereby facilitating power and data communication between the units 71, 80.

The ink handling and storage reservoirs 82 are in the form of a plurality of polyethylene membrane pockets that separately store different types of inks and printing fluids for printing. For example, the cartridge unit 80 may be provided with six separate polyethylene membrane reservoirs for storing cyan, magenta, yellow and black ink for full colour printing as well as infra-red ink for specific printing applications and an ink fixative to aid in the setting of the ink. Each or the reservoirs 82 may be in fluid communication with a corresponding inlet provided in a refill port (not shown) formed on the periphery of the body of the cartridge unit 80. As such, the reservoirs 82 are able to be individually refilled by bringing an ink refill dispenser into contact with the refill port and delivering ink under pressure into the reservoirs 82. As mentioned previously, the ink refill dispenser may be equipped with a QA chip which is read by a corresponding reader provided on the body of the cartridge unit 80. The associated data is then transmitted to the SoPEC device provided in the control electronics 72 of the cradle unit 71 to ensure the integrity and quality of the refill fluid. To facilitate refilling, the polyethylene membrane reservoirs 82 are configured such that as they fill they expand to accommodate the fluid and as the ink/fluid is consumed during the printing process the reservoir collapses.

Ink and printing fluids stored within the reservoirs 82 are delivered to the printhead integrated circuit 81 via a series of conduits 79 arranged to carry a specific fluid, such as a particular colour ink or fixative, and to allow the fluid to be distributed to the correct ink delivery nozzle provided along the length of the printhead integrated circuit 81. The manner in which this is achieved and the general construction of the cartridge unit 80 has been described in the present Applicant's United States patent applications Filing Docket Nos. RRA01US to RRA33US, the disclosures of which are all incorporated herein by reference. The above applications have been identified by their filing docket number, which will be substituted with the corresponding application number, once assigned.

As mentioned above, the printhead integrated circuit 81 of the cartridge unit 80 is a pagewidth printhead integrated circuit which is configured to extend a width of around 22.4 cm (8.8 inches) to accommodate print media of a variable width up to around 21.6 cm, which is equivalent to media having the width of standard A4 or US letter form. It is also envisaged however, that the pagewidth printhead integrated circuit 81 may also be fabricated to have a greater or lesser width, dependant greatly upon the application of the printer unit 2 and the type of print media used. In order to achieve the desired width, the printhead integrated circuit 81 may be made up of a one or more adjacently mounted integrated circuits with each integrated circuit having a plurality of ink delivery nozzles provided thereon.

Figure 24:
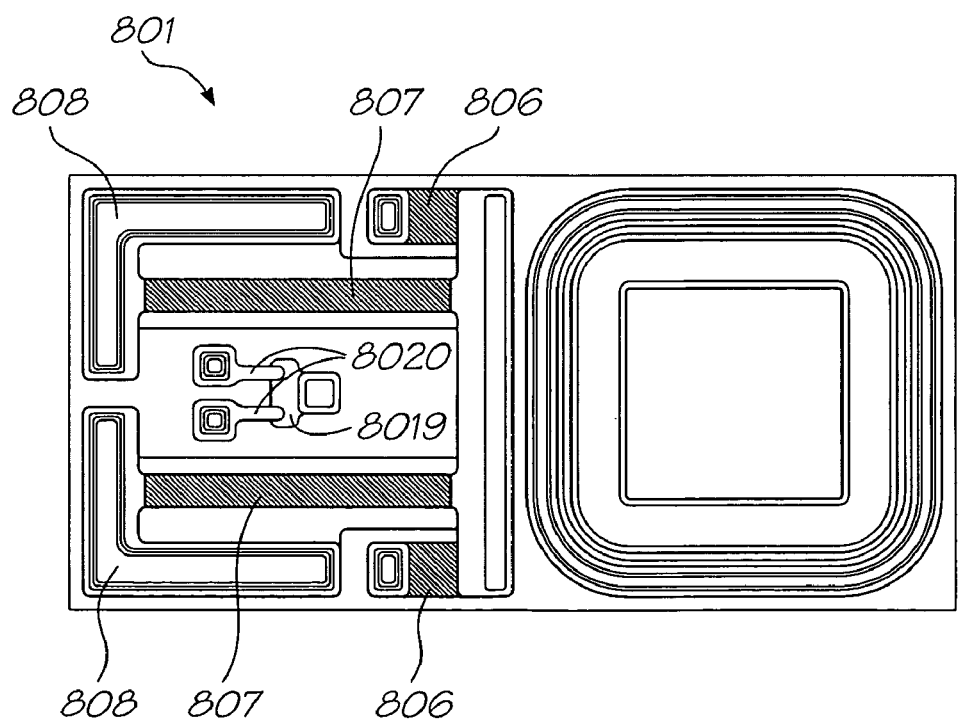
FIG. 24 shows a plan view of the nozzle of FIG. 16 with the lever arm and movable nozzle removed for clarity.
Figure 25:
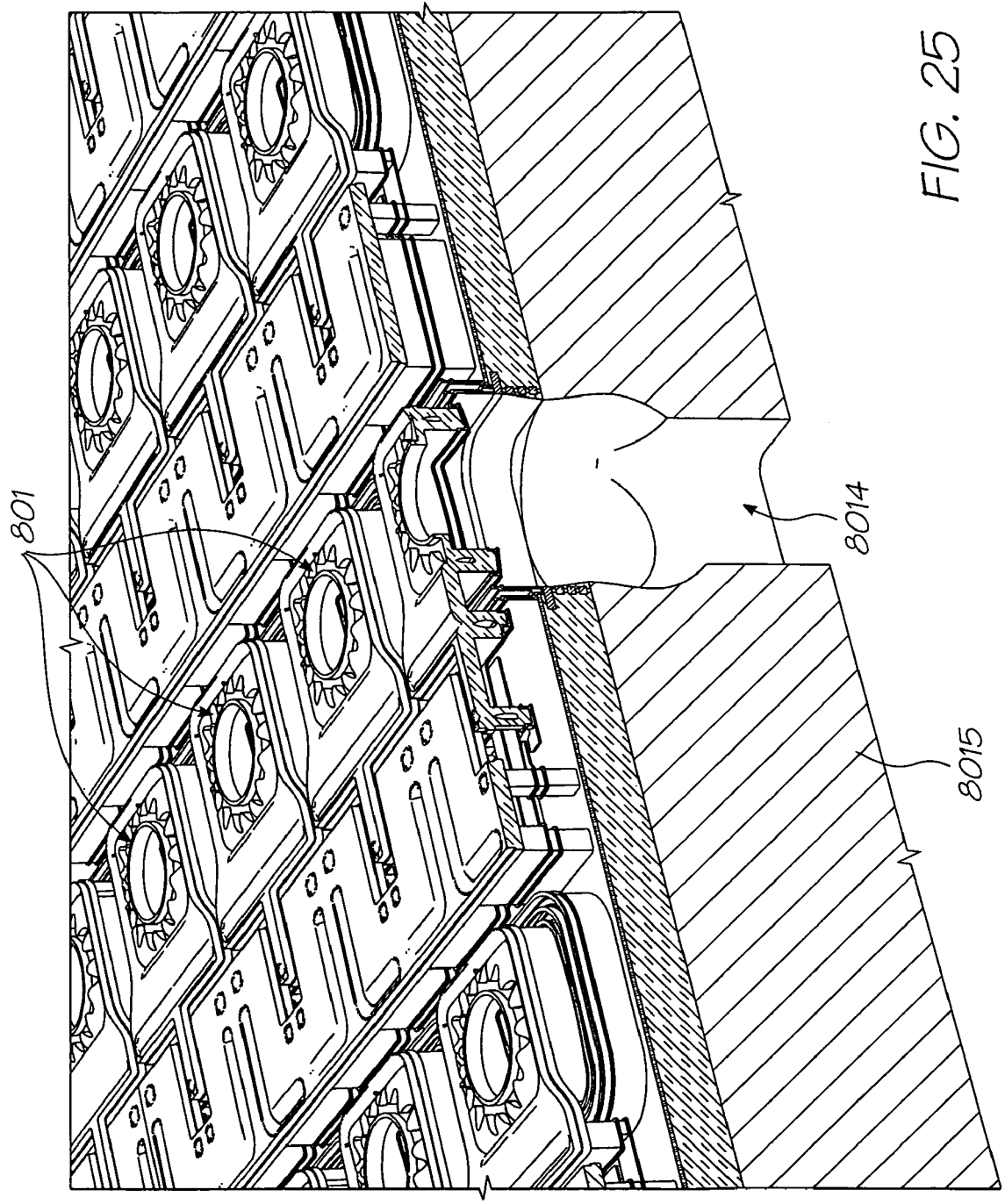
FIG. 25 shows a perspective vertical sectional view of a part of a printhead chip incorporating a plurality of the nozzle arrangements of the type shown in FIG. 16.

An example of a type of printhead nozzle arrangement suitable for the present invention, comprising a nozzle and corresponding actuator, will now be described with reference to FIGS. 16 to 25. FIG. 25 shows an array of the nozzle arrangements 801 formed on a silicon substrate 8015. Each of the nozzle arrangements 801 are identical, however groups of nozzle arrangements 801 are arranged to be fed with different colored inks or fixative. In this regard, the nozzle arrangements are arranged in rows and are staggered with respect to each other, allowing closer spacing of ink dots during printing than would be possible with a single row of nozzles. Such an arrangement makes it possible to provide the density of nozzles as described above. The multiple rows also allow for redundancy (if desired), thereby allowing for a predetermined failure rate per nozzle.

Each nozzle arrangement 801 is the product of an integrated circuit fabrication technique. In particular, the nozzle arrangement 801 defines a micro-electromechanical system (MEMS).

For clarity and ease of description, the construction and operation of a single nozzle arrangement 801 will be described with reference to FIGS. 16 to 24.

The inkjet printhead chip 81 includes a silicon wafer substrate 8015 having 0.35 Micron 1 P4M 12 volt CMOS microprocessing electronics is positioned thereon.

A silicon dioxide (or alternatively glass) layer 8017 is positioned on the substrate 8015. The silicon dioxide layer 8017 defines CMOS dielectric layers. CMOS top-level metal defines a pair of aligned aluminium electrode contact layers 8030 positioned on the silicon dioxide layer 8017. Both the silicon wafer substrate 8015 and the silicon dioxide layer 8017 are etched to define an ink inlet channel 8014 having a generally circular cross section (in plan). An aluminium diffusion barrier 8028 of CMOS metal 1, CMOS metal 2/3 and CMOS top level metal is positioned in the silicon dioxide layer 8017 about the ink inlet channel 8014. The diffusion barrier 8028 serves to inhibit the diffusion of hydroxyl ions through CMOS oxide layers of the drive electronics layer 8017.

A passivation layer in the form of a layer of silicon nitride 8031 is positioned over the aluminium contact layers 8030 and the silicon dioxide layer 8017. Each portion of the passivation layer 8031 positioned over the contact layers 8030 has an opening 8032 defined therein to provide access to the contacts 8030.

Figure 18:
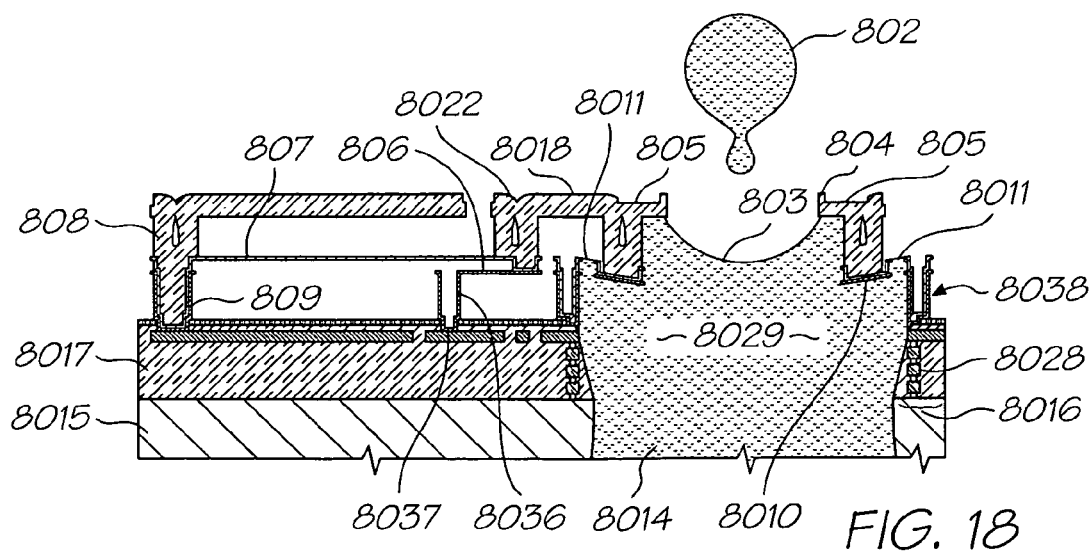
FIG. 18 shows a vertical sectional view of the nozzle of FIG. 17 later in the actuation phase.

The nozzle arrangement 801 includes a nozzle chamber 8029 defined by an annular nozzle wall 8033, which terminates at an upper end in a nozzle roof 8034 and a radially inner nozzle rim 804 that is circular in plan. The ink inlet channel 8014 is in fluid communication with the nozzle chamber 8029. At a lower end of the nozzle wall, there is disposed a moving rim 8010, that includes a moving seal lip 8040. An encircling wall 8038 surrounds the movable nozzle, and includes a stationary seal lip 8039 that, when the nozzle is at rest as shown in FIG. 18, is adjacent the moving rim 8010. A fluidic seal 8011 is formed due to the surface tension of ink trapped between the stationary seal lip 8039 and the moving seal lip 8040. This prevents leakage of ink from the chamber whilst providing a low resistance coupling between the encircling wall 8038 and the nozzle wall 8033.

Figure 23:
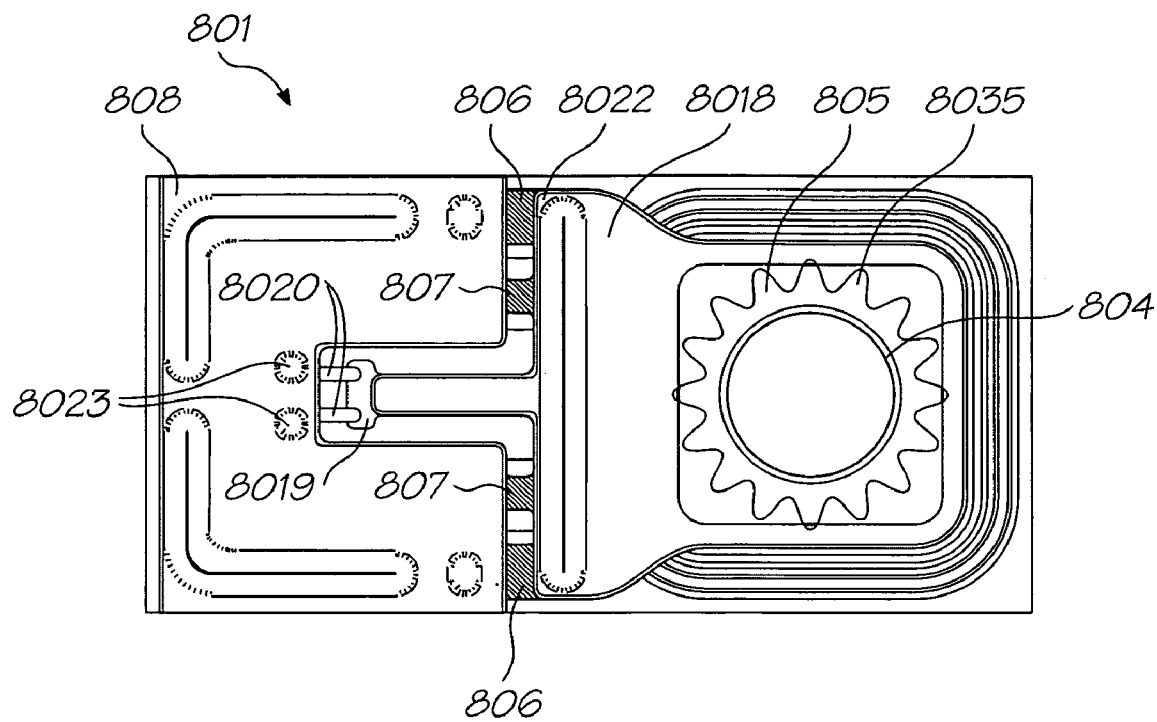
FIG. 23 shows a plan view of the nozzle of FIG. 16.

As best shown in FIG. 23, a plurality of radially extending recesses 8035 is defined in the roof 8034 about the nozzle rim 804. The recesses 8035 serve to contain radial ink flow as a result of ink escaping past the nozzle rim 804.

The nozzle wall 8033 forms part of a lever arrangement that is mounted to a carrier 8036 having a generally U-shaped profile with a base 8037 attached to the layer 8031 of silicon nitride.

Figure 19:
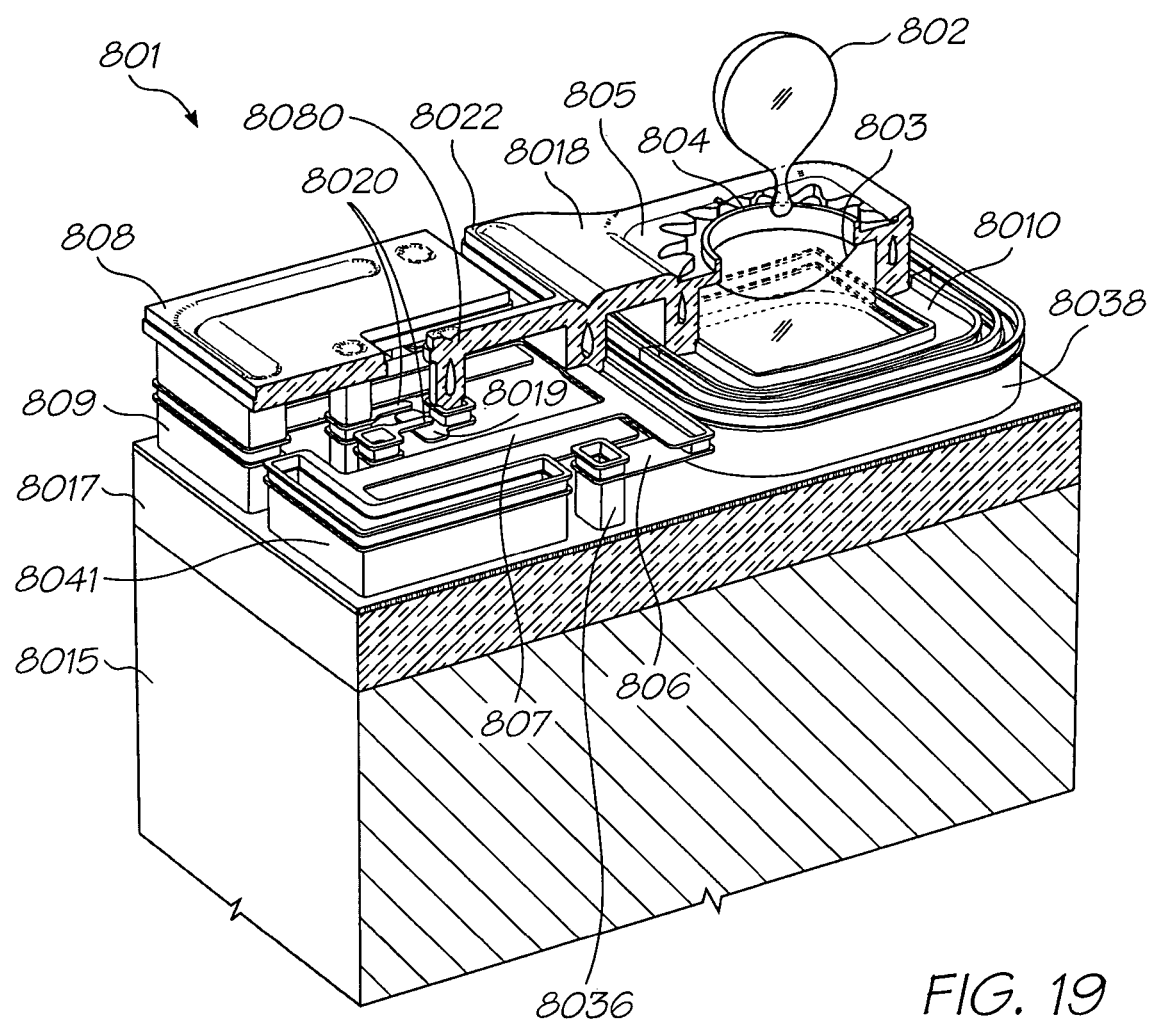
FIG. 19 shows a perspective partial vertical sectional view of the nozzle of FIG. 16, at the actuation state shown in FIG. 18.
Figure 20:
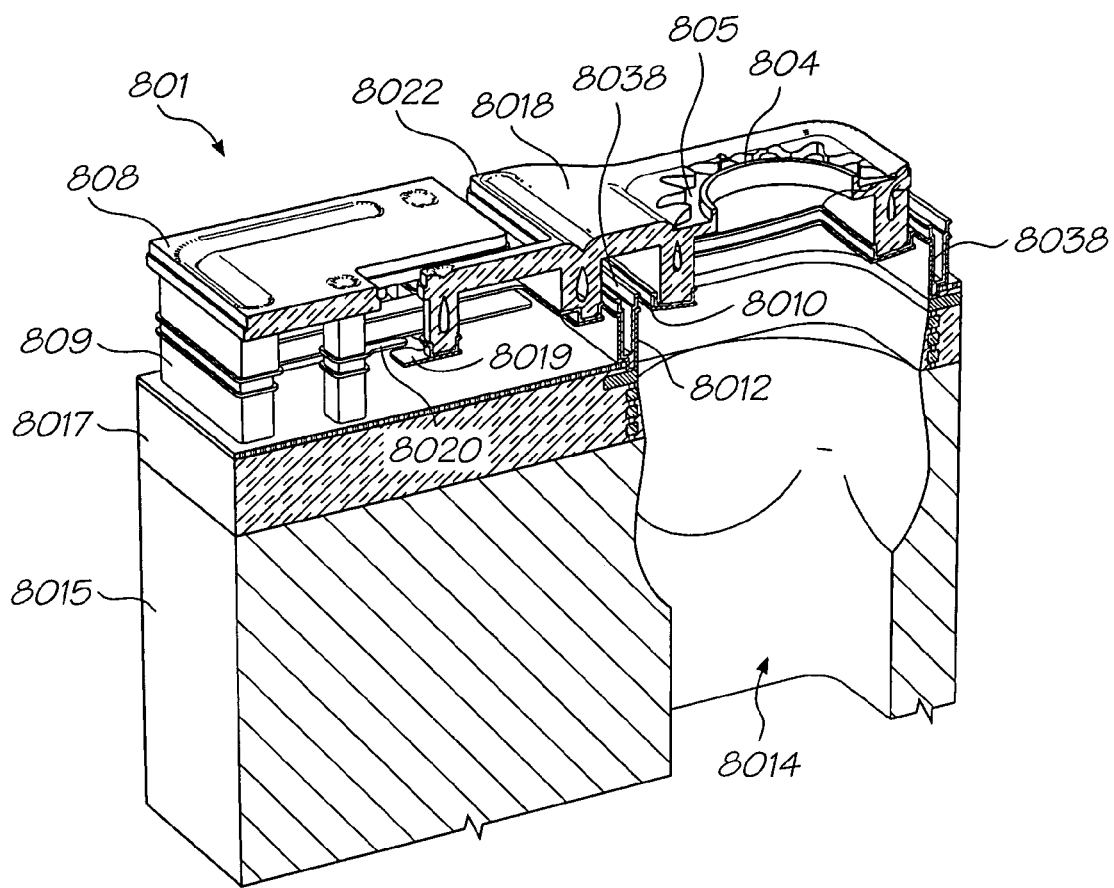
FIG. 20 shows a perspective vertical section of the nozzle of FIG. 16, with ink omitted.
Figure 21:
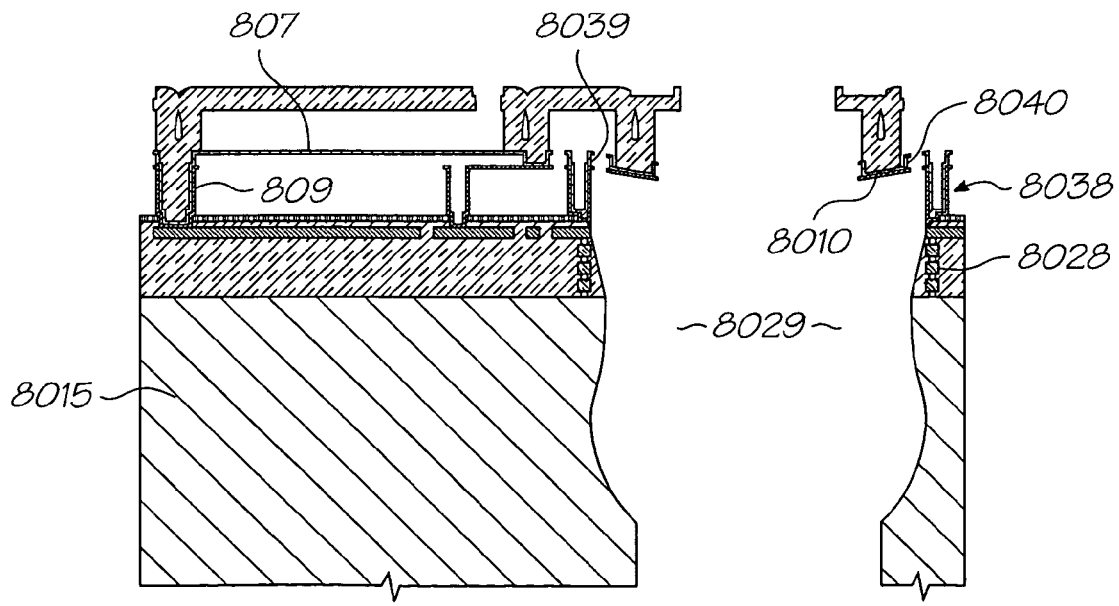
FIG. 21 shows a vertical sectional view of the of the nozzle of FIG. 20.

The lever arrangement also includes a lever arm 8018 that extends from the nozzle walls and incorporates a lateral stiffening beam 8022. The lever arm 8018 is attached to a pair of passive beams 806, formed from titanium nitride (TiN) and positioned on either side of the nozzle arrangement, as best shown in FIGS. 19 and 24. The other ends of the passive beams 806 are attached to the carrier 8036.

The lever arm 8018 is also attached to an actuator beam 807, which is formed from TiN. It will be noted that this attachment to the actuator beam is made at a point a small but critical distance higher than the attachments to the passive beam 806.

Figure 16:
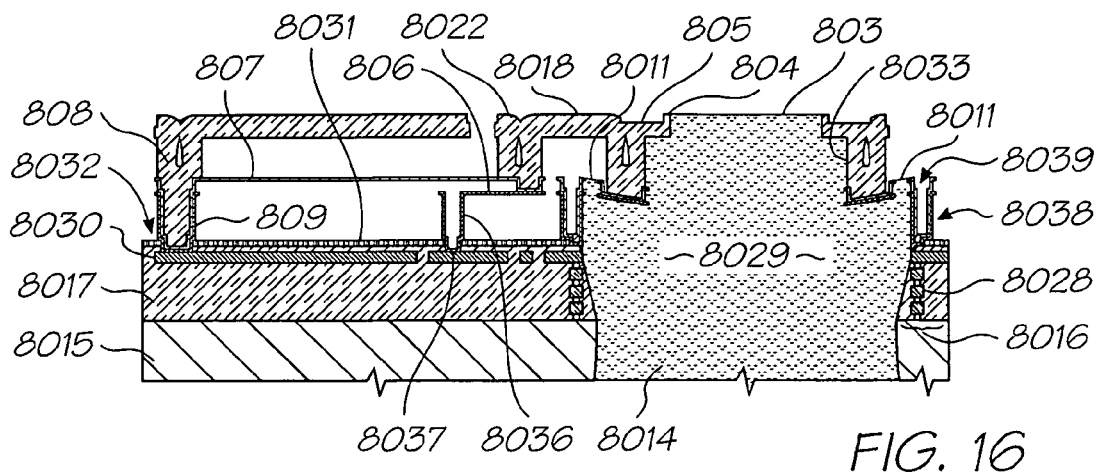
FIG. 16 shows a vertical sectional view of a single nozzle for ejecting ink, for use with the invention, in a quiescent state.
Figure 22:
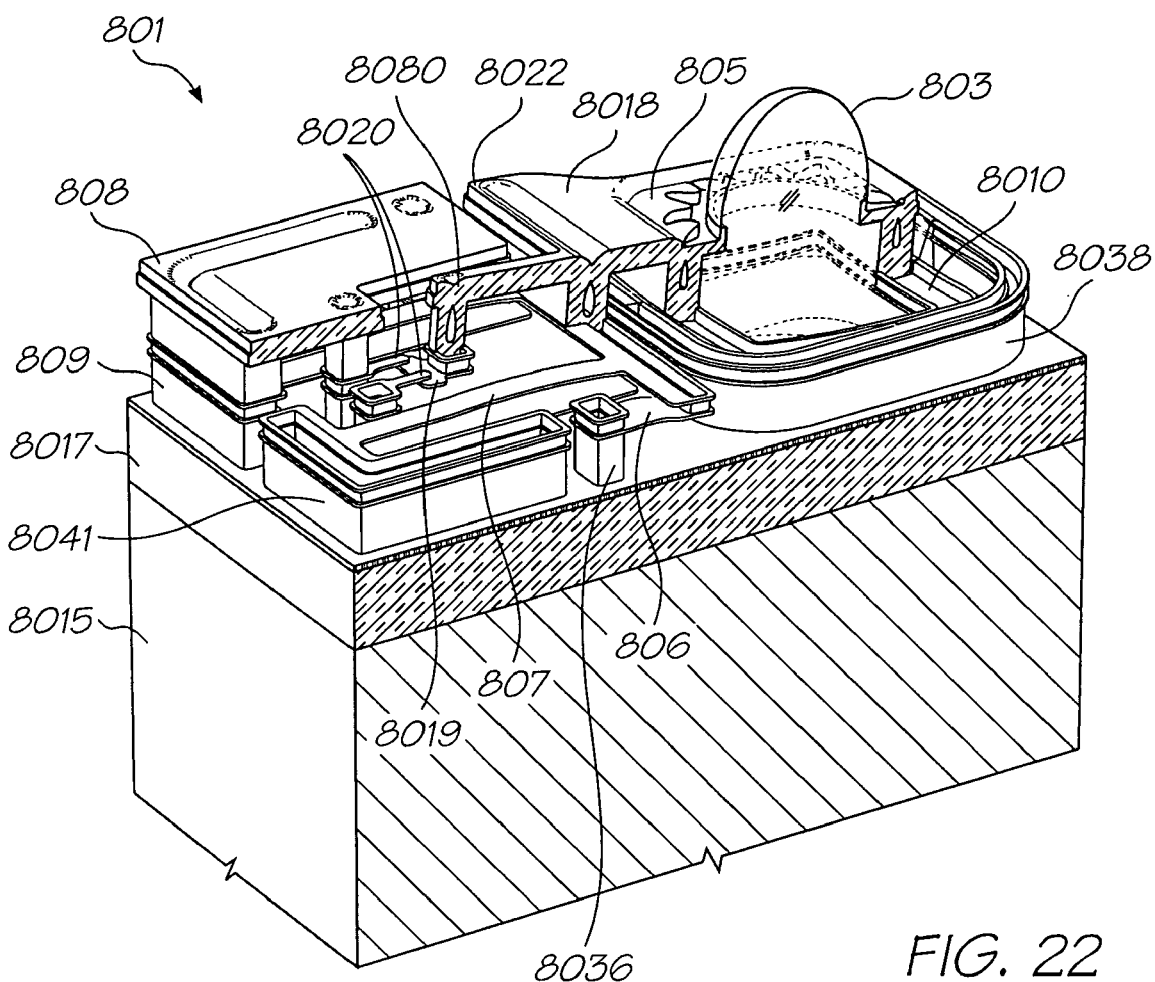
FIG. 22 shows a perspective partial vertical sectional view of the nozzle of FIG. 16, at the actuation state shown in FIG. 17.

As best shown in FIGS. 16 and 22, the actuator beam 807 is substantially U-shaped in plan, defining a current path between the electrode 809 and an opposite electrode 8041. Each of the electrodes 809 and 8041 are electrically connected to respective points in the contact layer 8030. As well as being electrically coupled via the contacts 809, the actuator beam is also mechanically anchored to anchor 808. The anchor 808 is configured to constrain motion of the actuator beam 807 to the left of FIGS. 16 to 18 when the nozzle arrangement is in operation.

The TiN in the actuator beam 807 is conductive, but has a high enough electrical resistance that it undergoes self-heating when a current is passed between the electrodes 809 and 8041. No current flows through the passive beams 806, so they do not expand.

In use, the device at rest is filled with ink 8013 that defines a meniscus 803 under the influence of surface tension. The ink is retained in the chamber 8029 by the meniscus, and will not generally leak out in the absence of some other physical influence.

Figure 17:
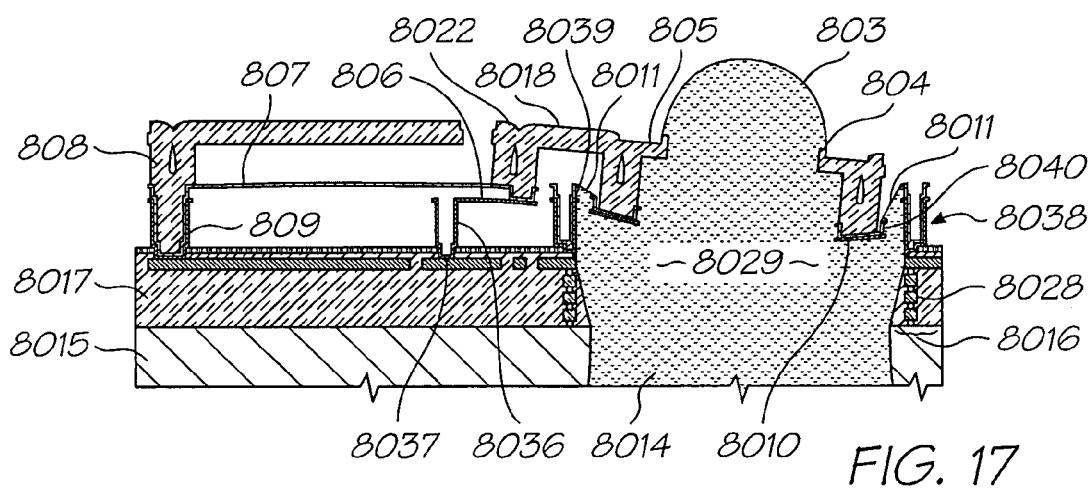
FIG. 17 shows a vertical sectional view of the nozzle of FIG. 16 during an initial actuation phase.

As shown in FIG. 17, to fire ink from the nozzle, a current is passed between the contacts 809 and 8041, passing through the actuator beam 807. The self-heating of the beam 807 due to its resistance causes the beam to expand. The dimensions and design of the actuator beam 807 mean that the majority of the expansion in a horizontal direction with respect to FIGS. 16 to 18. The expansion is constrained to the left by the anchor 808, so the end of the actuator beam 807 adjacent the lever arm 8018 is impelled to the right.

The relative horizontal inflexibility of the passive beams 806 prevents them from allowing much horizontal movement the lever arm 8018. However, the relative displacement of the attachment points of the passive beams and actuator beam respectively to the lever arm causes a twisting movement that causes the lever arm 8018 to move generally downwards. The movement is effectively a pivoting or hinging motion. However, the absence of a true pivot point means that the rotation is about a pivot region defined by bending of the passive beams 806.

The downward movement (and slight rotation) of the lever arm 8018 is amplified by the distance of the nozzle wall 8033 from the passive beams 806. The downward movement of the nozzle walls and roof causes a pressure increase within the chamber 29, causing the meniscus to bulge as shown in FIG. 17. It will be noted that the surface tension of the ink means the fluid seal 11 is stretched by this motion without allowing ink to leak out.

As shown in FIG. 18, at the appropriate time, the drive current is stopped and the actuator beam 807 quickly cools and contracts. The contraction causes the lever arm to commence its return to the quiescent position, which in turn causes a reduction in pressure in the chamber 8029. The interplay of the momentum of the bulging ink and its inherent surface tension, and the negative pressure caused by the upward movement of the nozzle chamber 8029 causes thinning, and ultimately snapping, of the bulging meniscus to define an ink drop 802 that continues upwards until it contacts adjacent print media.

Immediately after the drop 802 detaches, meniscus 803 forms the concave shape shown in FIG. 18. Surface tension causes the pressure in the chamber 8029 to remain relatively low until ink has been sucked upwards through the inlet 8014, which returns the nozzle arrangement and the ink to the quiescent situation shown in FIG. 16.

The printhead integrated circuit 81 may be arranged to have between 5000 to 100,000 of the above described nozzles arranged along its surface, depending upon the length of the printhead integrated circuit 81 and the desired printing properties required. For example, for narrow media it may be possible to only require 5000 nozzles arranged along the surface of the printhead to achieve a desired printing result, whereas for wider media a minimum of 10,000, 20,000 or 50,000 nozzles may need to be provided along the length of the printhead to achieve the desired printing result. For full colour photo quality images on A4 or US letter sized media at or around 1600 dpi, the printhead integrated circuit 81 may have 13824 nozzles per color. Therefore, in the case where the printhead integrated circuit 81 is capable of printing in 4 colours (C, M, Y, K), the printhead integrated circuit 81 may have around 53396 nozzles disposed along the surface thereof. Further, in a case where the printhead integrated circuit 81 is capable of printing 6 printing fluids (C, M, Y, K, IR and a fixative) this may result in 82944 nozzles being provided on the surface of the printhead integrated circuit 81. In all such arrangements, the electronics supporting each nozzle is the same.

The manner in which the individual nozzle arrangements 101 are controlled within the printhead integrated circuit 81 will now be described with reference to FIGS. 26-29.

Figure 26:
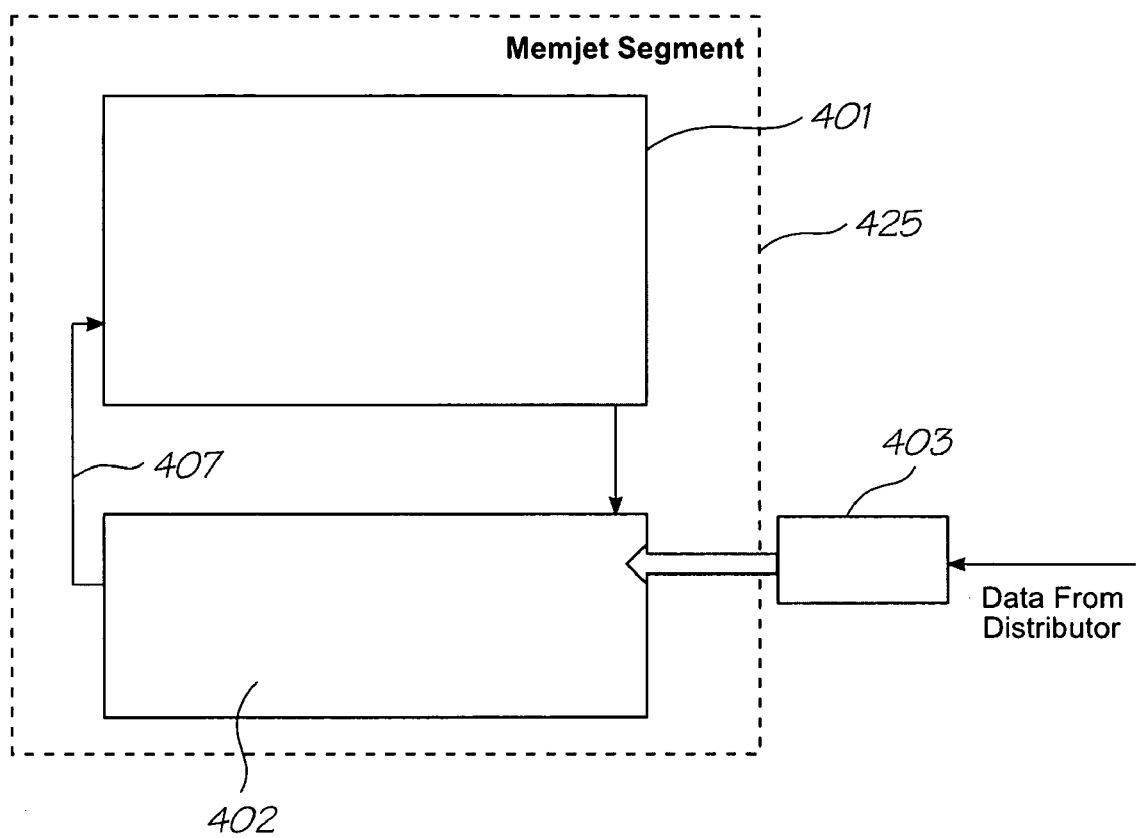
FIG. 26 shows a schematic showing CMOS drive and control blocks for use with the printer unit of the present invention.

FIG. 26 shows an overview of the printhead integrated circuit 81 and its connections to the SoPEC device provided within the control electronics 72 of the printer unit 2. As discussed above, printhead integrated circuit 81 includes a nozzle core array 401 containing the repeated logic to fire each nozzle, and nozzle control logic 402 to generate the timing signals to fire the nozzles. The nozzle control logic 402 receives data from the SoPEC device via a high-speed link.

The nozzle control logic 402 is configured to send serial data to the nozzle array core for printing, via a link 407, which may be in the form of an electrical connector. Status and other operational information about the nozzle array core 401 is communicated back to the nozzle control logic 402 via another link 408, which may be also provided on the electrical connector.

Figure 27:
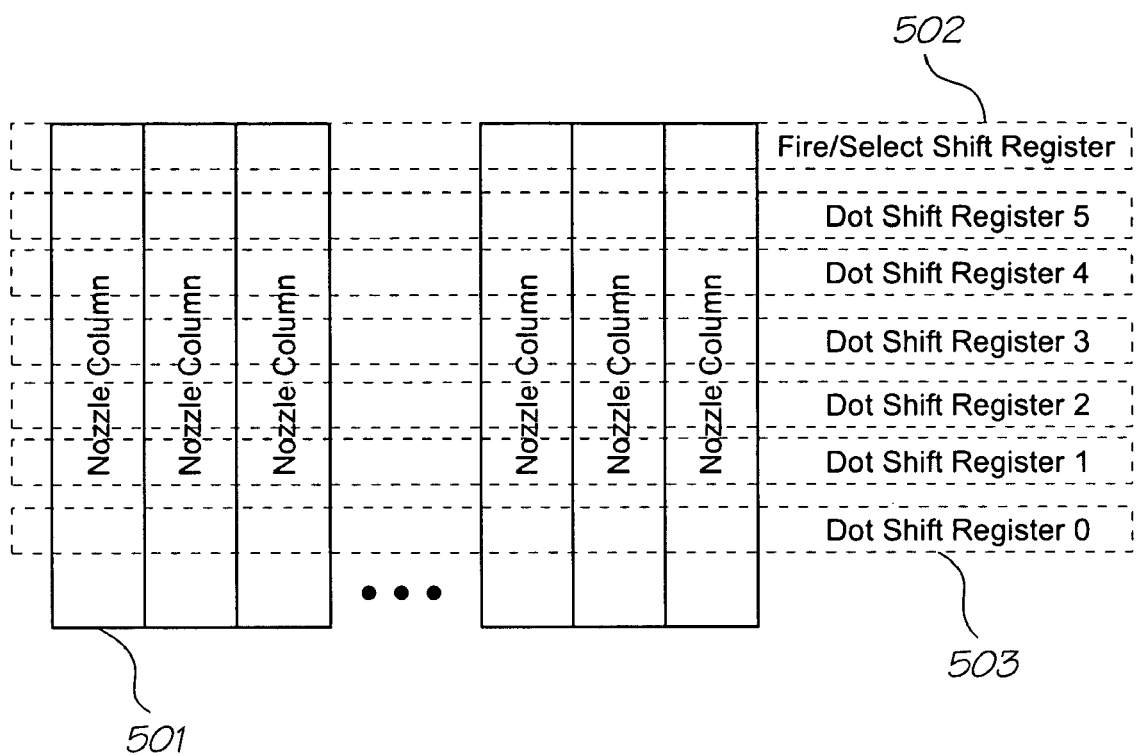
FIG. 27 shows a schematic showing the relationship between nozzle columns and dot shift registers in the CMOS blocks of FIG. 26.
Figure 28:
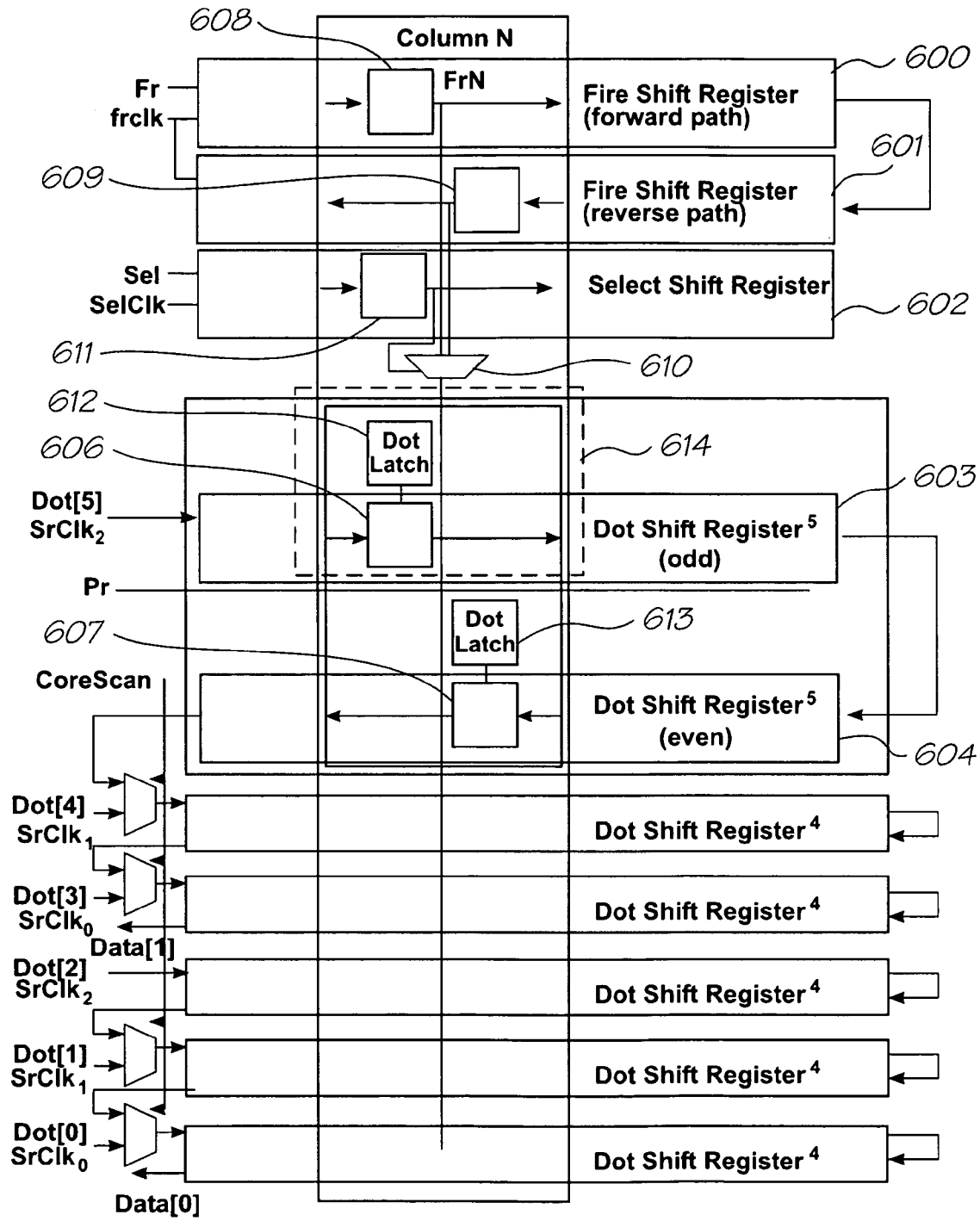
FIG. 28 shows a more detailed schematic showing a unit cell and its relationship to the nozzle columns and dot shift registers of FIG. 27.

The nozzle array core 401 is shown in more detail in FIGS. 27 and 28. In FIG. 27, it will be seen that the nozzle array core 401 comprises an array of nozzle columns 501. The array includes a fire/select shift register 502 and up to 6 color channels, each of which is represented by a corresponding dot shift register 503.

As shown in FIG. 28, the fire/select shift register 502 includes forward path fire shift register 600, a reverse path fire shift register 601 and a select shift register 602. Each dot shift register 503 includes an odd dot shift register 603 and an even dot shift register 604. The odd and even dot shift registers 603 and 604 are connected at one end such that data is clocked through the odd shift register 603 in one direction, then through the even shift register 604 in the reverse direction. The output of all but the final even dot shift register is fed to one input of a multiplexer 605. This input of the multiplexer is selected by a signal (corescan) during post-production testing. In normal operation, the corescan signal selects dot data input Dot[x] supplied to the other input of the multiplexer 605. This causes Dot[x] for each color to be supplied to the respective dot shift registers 503.

A single column N will now be described with reference to FIG. 28. In the embodiment shown, the column N includes 12 data values, comprising an odd data value 606 and an even data value 607 for each of the six dot shift registers. Column N also includes an odd fire value 608 from the forward fire shift register 600 and an even fire value 609 from the reverse fire shift register 601, which are supplied as inputs to a multiplexer 610. The output of the multiplexer 610 is controlled by the select value 611 in the select shift register 602. When the select value is zero, the odd fire value is output, and when the select value is one, the even fire value is output.

Each of the odd and even data values 606 and 607 is provided as an input to corresponding odd and even dot latches 612 and 613 respectively.

Each dot latch and its associated data value form a unit cell, such as unit cell 614. A unit cell is shown in more detail in FIG. 29. The dot latch 612 is a D-type flip-flop that accepts the output of the data value 606, which is held by a D-type flip-flop 614 forming an element of the odd dot shift register 603. The data input to the flip-flop 614 is provided from the output of a previous element in the odd dot shift register (unless the element under consideration is the first element in the shift register, in which case its input is the Dot[x] value). Data is clocked from the output of flip-flop 614 into latch 612 upon receipt of a negative pulse provided on LsyncL.

The output of latch 612 is provided as one of the inputs to a three-input AND gate 615. Other inputs to the AND gate 615 are the Fr signal (from the output of multiplexer 610) and a pulse profile signal Pr. The firing time of a nozzle is controlled by the pulse profile signal Pr, and can be, for example, lengthened to take into account a low voltage condition that arises due to low power supply (in a removable power supply embodiment). This is to ensure that a relatively consistent amount of ink is efficiently ejected from each nozzle as it is fired. In the embodiment described, the profile signal Pr is the same for each dot shift register, which provides a balance between complexity, cost and performance. However, in other embodiments, the Pr signal can be applied globally (ie, is the same for all nozzles), or can be individually tailored to each unit cell or even to each nozzle.

Once the data is loaded into the latch 612, the fire enable Fr and pulse profile Pr signals are applied to the AND gate 615, combining to the trigger the nozzle to eject a dot of ink for each latch 612 that contains a logic 1.

The signals for each nozzle channel are summarized in the following table:

| Name | Direction | Description |
|---|---|---|
| D | Input | Input dot pattern to shift register bit |
| Q | Output | Output dot pattern from shift register bit |
| SrClk | Input | Shift register clock in - d is captured on rising edge of this clock |
| LsyncL | Input | Fire enable - needs to be asserted for nozzle to fire |
| Pr | Input | Profile - needs to be asserted for nozzle to fire |

Figure 29:
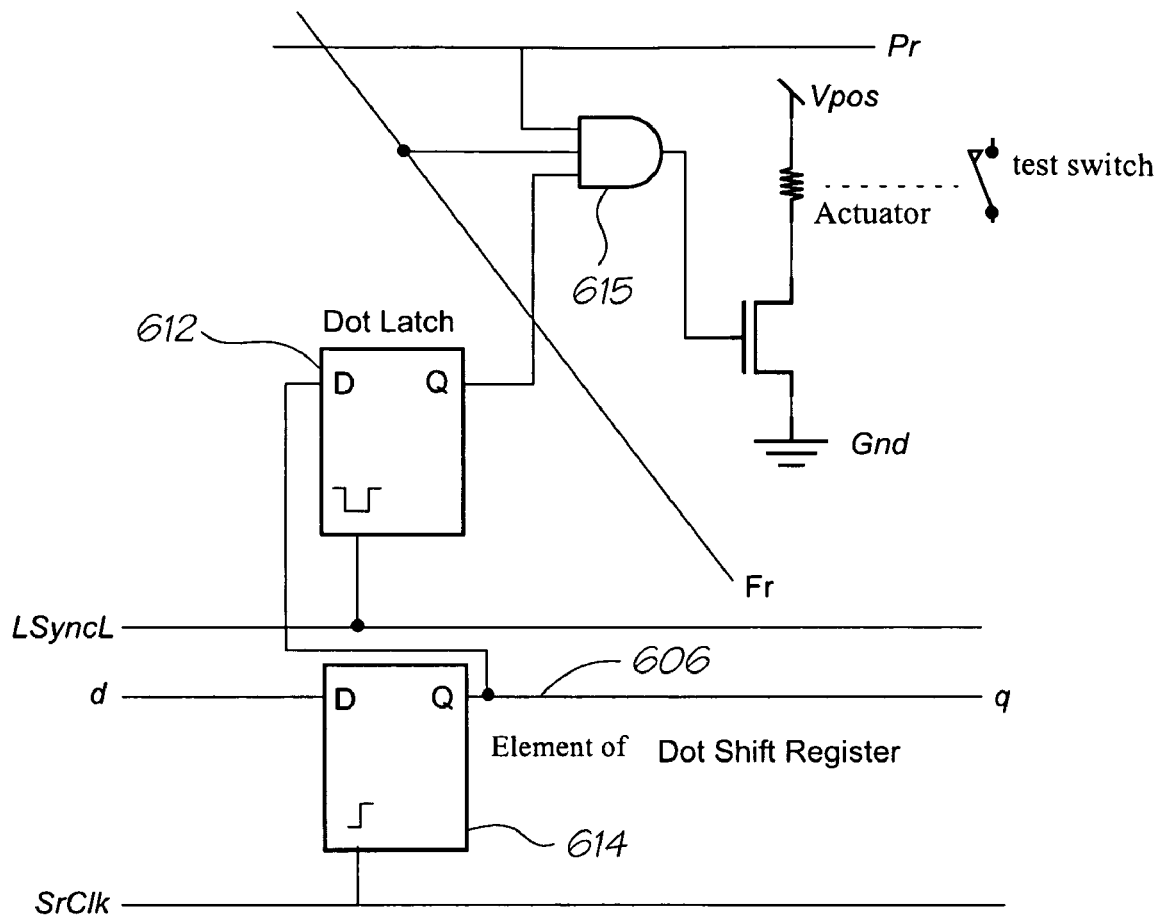
FIG. 29 shows a circuit diagram showing logic for a single printer nozzle suitable for use with the printer unit of the present invention.

As shown in FIG. 29, the fire signals Fr are routed on a diagonal, to enable firing of one color in the current column, the next color in the following column, and so on. This averages the current demand by spreading it over 6 columns in time-delayed fashion.

The dot latches and the latches forming the various shift registers are fully static in this embodiment, and are CMOS-based. The design and construction of latches is well known to those skilled in the art of integrated circuit engineering and design, and so will not be described in detail in this document.

The nozzle speed may be as much as 20 kHz for the printer unit 2 capable of printing at about 60 ppm, and even more for higher speeds. It should be appreciated that all references to printing speeds and ppm, will refer to pages printed with full process colour images (not spot colour) and requiring at least 80% image coverage of the page. Hence a printing speed of 60 ppm refers to the printing of a 60 page of media per minute whereby the pages are printed with full process colour images that cover at least 80% of each page. As such, all comparisons with existing printer units are based upon this printing requirement. At this range of nozzle speeds the amount of ink than can be ejected by the entire printhead 81 is at least 50 million drops per second. However, as the number of nozzles is increased to provide for higher-speed and higher-quality printing at least 100 million drops per second, preferably at least 300 million drops per second, and more preferably at least 1 billion drops per second may be delivered. Consequently, in order to accommodate printing at these speeds, the control electronics 72, must be able to determine whether a nozzle is to eject a drop of ink at an equivalent rate. In this regard, in some instances the control electronics must be able to determine whether a nozzle ejects a drop of ink at a rate of at least 50 million determinations per second. This may increase to at least 100 million determinations per second or at least 300 million determinations per second, and in many cases at least 1 billion determinations per second for the higher-speed, higher-quality printing applications.

For the printer unit 2 of the present invention, the above-described ranges of the number of nozzles provided on the printhead chip 81 together with the nozzle firing speeds print speeds results in an area print speed of at least 50 cm$^2$ per second, and depending on the printing speed, at least 100 cm$^2$ per second, preferably at least 200 cm$^2$ per second, and more preferably at least 500 cm$^2$ per second at the higher-speeds. Such an arrangement provides a printer unit 100 that is capable of printing an area of media at speeds not previously attainable with conventional printer units As mentioned previously, the above described nozzle arrangements are formed in the printhead integrated circuit 81 of the cartridge unit 80, which forms one part of the print engine 70. The cartridge unit 80 relies upon data and power to be transferred from the control electronics 72 of the cradle unit 71 in order to function and also relies upon the cradle unit 71 to support the printhead integrated circuit 81 in a printing position and deliver the print media past the printhead integrated circuit 81 for printing.

In this regard, the cradle unit 71 forms the second part of the print engine 70 and is retained within the internal cavity 12 of the main body 3 via mountings (not shown) provided on the upper and lower frame units 7, 6. In this position, as shown in FIGS. 13 and 14, the cradle unit 71 is able to receive data from external data sources via a connector element 73 which is in electrical communication with the data connector sockets 17 provided on the rear 9 of the main body 3. The connector element 73 is preferably a flexible printed circuit board (PCB), positioned to align with a corresponding connector provided on the cradle unit 71. Similarly, power is supplied to the cradle unit 71 from the power supply unit 15 by way of power contacts (not shown) which extend into the internal cavity 12. The cradle unit 71 is provided with a suitable connector element (not shown) which connects with the power contacts 74 to deliver power to the cradle unit 71.

As shown more clearly in FIG. 14, the cradle unit 71 is shaped to receive the cartridge unit 80 such that when mated together both units form the print engine assembly 70. In this arrangement, data and power is able to be transferred between the units 71, 80 as previously described, thereby allowing the nozzles of the printhead integrated circuit 81 to be controlled in the manner previously described.

The body of the cradle unit 71 comprises a drive motor 75, a drive roller 76 and a pinch roller 77 for transporting paper through the print engine 70, a printhead maintenance unit 78 for providing capping and other forms of maintenance to the printhead integrated circuit 81, and control electronics 72 which includes the SoPEC device for controlling the overall operation of the printer unit 2. The body of the cradle unit also houses a media exit mechanism in the form of an exit roller 86 and idler wheels 87 to aid in delivering the printed media from the print engine 70 for collection.

The drive motor 75 is a standard brushless DC motor having bidirectional capabilities. The drive motor 75 is gearingly engaged with the drive roller 76 to provide driving motion to the drive roller 76 to control delivery of print media past the printhead integrated circuit 81. The speed at which the drive roller 76 is driven by the motor 75 is controlled by the control electronics 72 to ensure that the paper is delivered past the printhead 81 at the desired rate, which is typically up to, and in excess of, 60 ppm. The drive roller 76 engages with a pinch roller 77 and together the rollers 76, 77 cooperate to capture the print media supplied by the picker mechanism 60 and advance the print media past the printhead integrated circuit 81.

The cradle unit 71 is also provided with a printhead maintenance unit 78 which is also gearingly engaged to the drive motor 75. The printhead maintenance unit 78 includes a capping element that is adapted to be moved into position to cap the printhead integrated circuit 81 of the cartridge unit 80. In such instances, upon determination of an idle state of the printer unit 2, the control electronics 72 initiates engagement of the printhead maintenance unit 78 with the drive motor 75 to move the printhead maintenance unit 78 into capping engagement with the printhead integrated circuit 81. The capping engagement essentially forms a perimeter seal around the ink delivery nozzles of the printhead integrated circuit 81, thereby reducing the evaporation of moisture from the ink present in the ink delivery nozzles, and preventing ink from drying and clogging the nozzles. Similarly, upon determination of the onset of printing, the control electronics 72 initiates uncapping of the printhead integrated circuit 81 thereby allowing the printhead maintenance unit 78 to return to an uncapped position such as that shown in FIG. 16. The printhead maintenance 78 unit may also perform other features such as wiping or blotting of the printhead 81, as necessary.

The paper exit mechanism 85 is positioned on the inside of the cradle unit 70 downstream of the printhead integrated circuit 81, and consists of an exit roller 86 and a plurality of idler wheels 87. The exit roller 86 is provided by an elongate shaft that extends across the cradle unit. The exit roller 86 may have a plurality of gripping elements equispaced along the length of the shaft to aid in capturing the media for delivery to the media output assembly 5. The exit roller 86 is driven by the drive motor 75 of the cradle unit 71 via appropriately arranged drive gears, and the control electronics 72 of the cradle unit 71 is able to control the operation of the paper exit mechanism 85 to ensure that it is initiated at an appropriate time and speed to correspond with the speed and timing of the drive roller 76 of the cradle unit 71.

The idler wheels 87 of the paper exit mechanism 85 act in cooperation with the exit roller 86 to capture and deliver the printed media to the media output assembly 5. The idler wheels 87 are flexibly connected to the inside surface of the cradle unit 71 and are arranged to be in rotational contact with the exit roller 86. As shown in FIG. 14, the idler wheels 87 are in the form of star wheels 91 which rotate upon the surface of the exit roller 86 and capture the media therebetween, such that the printed media can be delivered under action of the exit roller 86 to the media output assembly 5. This arrangement assists in controlling the removal of the sheet of printed media from the print engine 70 following printing.

It should be appreciated that whilst the paper exit mechanism 85 is shown as being contained within the cradle unit 71, the paper exit mechanism could also be provided remote from the cradle unit, and attached to the main body 3 of the printer unit. Further, whilst the paper exit mechanism 85 is shown as having star wheels 91, other types of idler rollers could also be employed as would be apparent to a person skilled in the art and still fall within the scope of the present invention.

As shown in FIG. 16, the body of the cradle unit 71 has an inlet 67 provided upstream of the printhead integrated circuit 81, adjacent the picker mechanism 60. The inlet 67 receives a leading edge of the print media delivered by the picker mechanism 60 and includes guide members 69 that assist in directing the leading edge of the print media towards the drive and pinch rollers 76, 77.

An outlet 68 is provided in the body of the cradle unit 71 downstream of the printhead integrated circuit 81 paper exit mechanism to provide a path for the print media to exit the print engine 70. Following printing by the printhead integrated circuit 81, the leading edge of the printed media exits the print engine 70 via the outlet 68 under the action of the paper exit mechanism 85.

In the described arrangement, the print engine 70 is located within the internal cavity 12 of the main body 3 to allow for a simple print media transport path from the media input assembly 4, through the print engine 70, and into the media output assembly 5.

As shown in FIG. 14, in order to simplify the path for the print media as it progresses through the printer unit 2, the print engine 70 is angularly disposed within the internal cavity 12 of the main body 3. The angular disposition of the print engine 70 results in the printhead integrated circuit 81 being angularly disposed, thus providing an angularly disposed printing zone, which aids in providing a shallow path for the print media as it passes from the media input assembly 4 through the printing zone to the media output assembly 5. Such a simplified and shallow print media path allows media of varying thicknesses and types, namely paper up to around 300 gsm, to be printed by the printer unit 2, such a variability in media handling capabilities which is typically lacking in conventional desktop printer units. This arrangement reduces the likelihood of the print media becoming jammed along its path and requiring constant monitoring and rectification and in some instances repair or replacement, should the media contact the printhead integrated circuit 81.

The angle in which the print engine 70 is disposed, and therefore the angle of inclination of the printhead integrated circuit 81, is largely dependant upon the angle with which the print media 10 is supplied to the printer unit 2, in particular the angle of inclination of the media input assembly 4. As shown in FIG. 16, the print media input assembly 4 has an angle of inclination of around 120°, the angle of inclination being measured in a counterclockwise direction from the positive x-axis, with a horizontal surface having an angle of inclination of 0°. The angle of inclination of the print media input assembly could vary from between 90°-160°. In the arrangement shown in FIG. 16, the print engine 70, and subsequently the printhead integrated circuit 81, has an angle of inclination of around 145°, which is greater than the angle of inclination of the print media input assembly 4. Therefore, in order to provide a shallow print media path that is capable of handling print media of varying weights and thicknesses, the printhead integrated circuit 81 is arranged to have an angle of inclination that is greater than the angle of inclination of the print media input assembly.

Image Reading Unit

Figure 30:
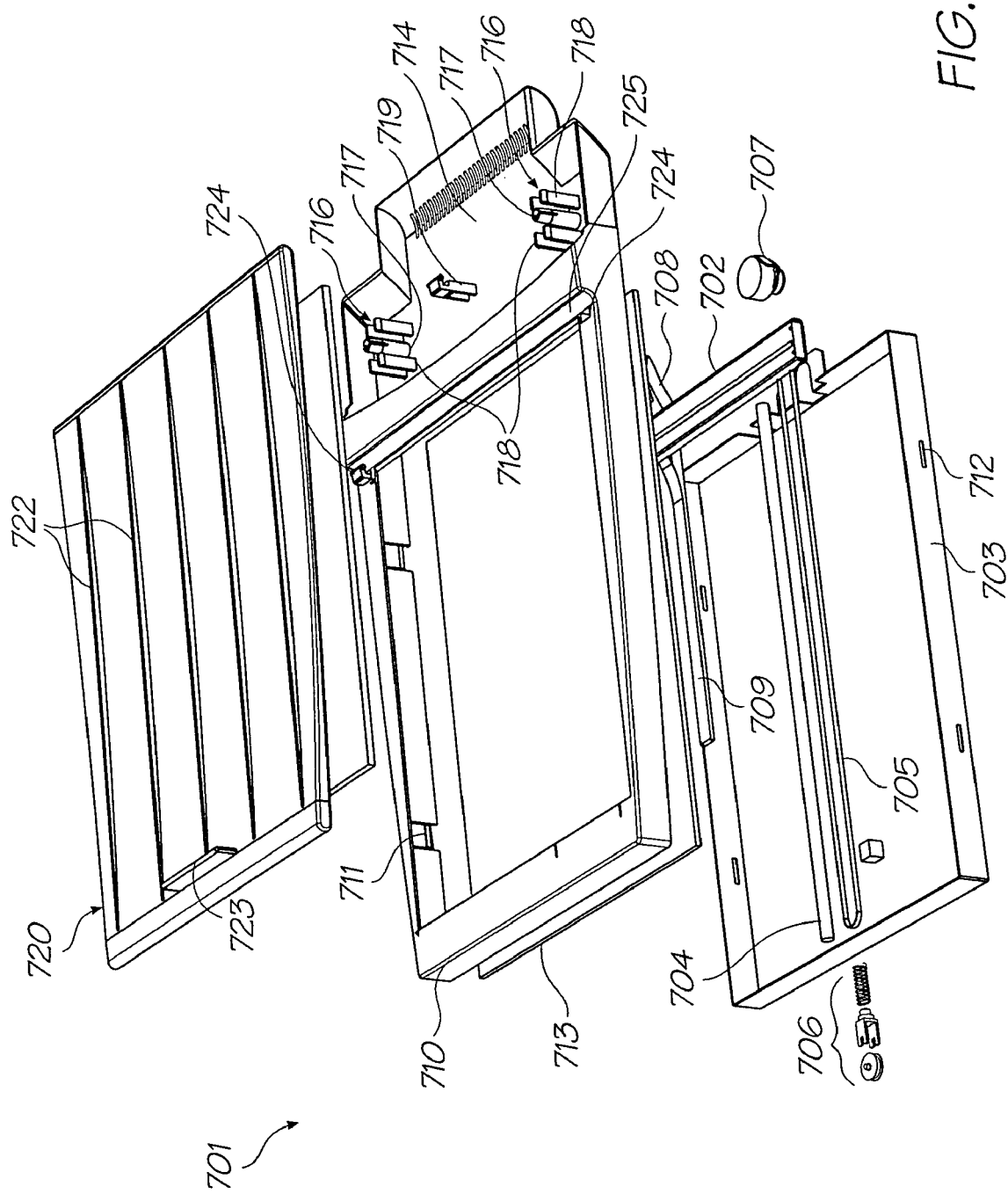
FIG. 30 shows an exploded front perspective view of the image reading unit of the present invention.

The image reading unit 701 of the image processing apparatus 1 is shown in exploded view in FIG. 30. As can be appreciated, the image reading unit 701 resembles a traditional flat bed scanner unit that employs a traditional reciprocating pagewidth image reader 702 to scan an image from a source. The image reader 702 is in the form of a scanner head assembly as would be understood by a person skilled in the art.

The image reading unit 701 generally consists of base 703, a frame 710 and a lid 720. The base 703 contains the various operational elements of the image reading unit 701. The image reader 702 is located within one end of the base 703 and is supported on a central shaft 704 along which the image reader 702 travels as it reads the image. A motor 707 is mounted to the base 703 to drive a belt assembly 705 which is arranged in a parallel relationship with the central shaft 704. The belt assembly 705 is connected to the image reader 702 and causes it to move along the central shaft 704 under action of the motor 707, thereby allowing the image reader 702 to traverse the base 703 to scan an image. A belt tensioning system 706 is employed at the end of the belt assembly 705 remote from the motor 707 to ensure that the belt is of a sufficient tension to provide consistent movement of the image reader 702 along the length of the scanner unit 701.

The image reader 702 and the motor 707 are controlled by a controller 708 provided on a PCB assembly (partially obscured). As the image reader 702 traverses the length of the image reading unit 701, it is connected to the controller 708 via a flex PCB 709 which is shown in a folded arrangement. In this regard, as the image reader 702 moves along the length of the base 703 the flex PCB 709 extends from the folded arrangement to ensure that the image reader 702 is in constant communication with the controller 708 to enable data and power to be transferred between the two elements. In this arrangement, image information associated with the image being read is collected by the image reader 702 and recorded or stored within the controller 708 for later processing.

The frame 710 is arranged to fit over the base 703 and be maintained in engagement via lugs 711 provided on the frame 710 which mate with corresponding recesses 712 provided on the base 703. A flat glass panel 713 is sandwiched between the base 703 and the frame 710. The glass panel 713 is intended to support a sheet of printed media and present the media for reading by the image reader 702 in the manner as described above.

At the rear of the frame 710 is provided a seat portion 714. The seat portion 714 forms an open receptacle having a floor portion 715 and two sets of locating elements 716 extending upwardly from the floor portion 715. The locating elements 716 each consist of a central cylindrical element 717 surrounded by four raised locating tabs 718. A spacer element 719 also extends from the floor portion 715 of the seat portion. The purpose of the locating elements 716 and the spacer element 719 is to receive the printer unit 2 in a manner which will be described in more detail below.

The lid 720 is arranged to be cover the glass panel 713 and is pivotally connected to the frame 710 to pivot between a closed position, whereby the lid covers the glass panel 713, and an open position, whereby the lid 720 is moved away from the glass panel 713. A pad 721 is provided on the inner surface of the lid 720 to assist in maintaining items to be read in position on the glass panel 713. In this regard, when the lid 720 is in a closed position, and an item to be read is placed on the glass panel 713, the pad 721 contacts the item and maintains the item in place on the surface of the glass panel 713.

The outer surface of the lid 720 is provided with a number of ridges 722 extending the length thereof and generally defines a flat surface that is used to collect printed media from the printer unit 2 in a manner which will be described in more detail below. An end stop 723 is provided on the outer surface of the lid 720 to aid in collection of printed media from the printer unit 2.

The lid 720 is attached to the frame 710 by way of a pair of pins (not shown) provided on two inner corners of the lid 720. The pins are received within two shaped recesses 724 provided on the outer surface of the frame 710 and this arrangement allows the lid 720 to pivot about the pins between an open and a closed position. A region of the frame 710 immediately adjacent the edge upon which the lid 720 is attached is provided with a grooved region 725 which assists the lid 720 in pivoting about the frame 710.

Whilst the image reading unit 710 described above and shown in FIG. 30 is a flat bed scanner employing a reciprocating pagewidth head assembly, it will be appreciated that the scanner unit could be any form of commercially available scanner units and as such the present invention is not limited to the type of scanner unit employed.

Multi-Purpose Image Processing Apparatus

In order to form the multi-purpose image processing apparatus 1 as shown in FIG. 1, both the printer unit 2 and the image reading unit 701 are constructed in a manner which allows simple assembly of both units together.

As alluded to previously, the seat portion 714 of the image reading unit 701 is configured to receive the base 8 of the printer unit 2, and the locating elements 716 act to secure the printer unit 2 in place.

Referring to FIG. 11, in order to assemble the printer unit 2 and the image reading unit 701 together to form the multi-purpose image processing apparatus 1, the media output assembly 5 is firstly removed from the base 8 of the printer unit 2. As the media output assembly 5 is slidingly received within a recessed portion formed in the base 8 of the printer unit 2, it can merely be removed from the base prior to assembly to the image reading unit 701. Two receiving regions 59 are formed on the surface of the base 8 and are in the form of a central circular recess, with four substantially rectangular recesses disposed about the central circular recess.

Figure 31:
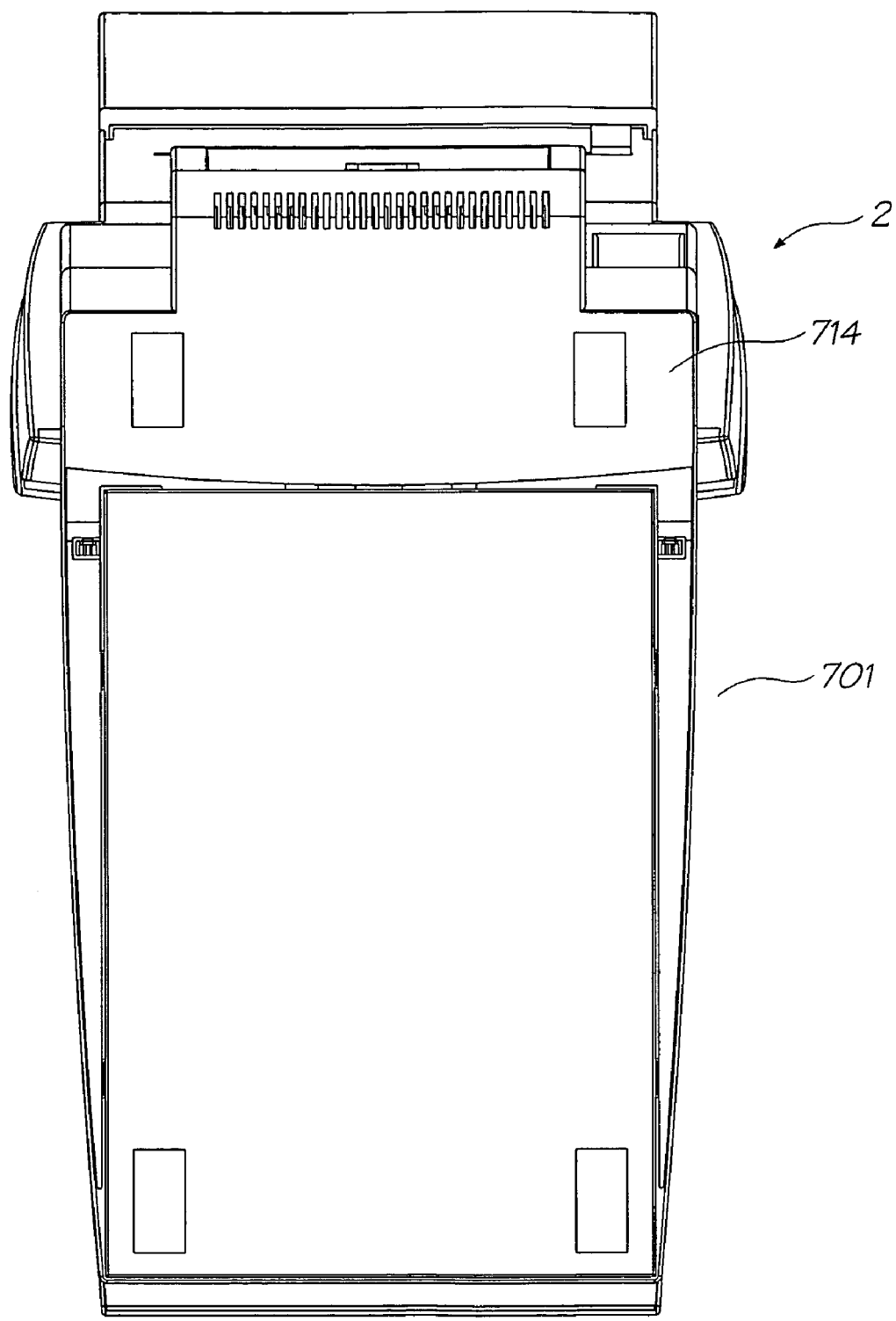
FIG. 31 shows a bottom plan view of the multi-purpose image processing apparatus of FIG. 1.
Figure 32:
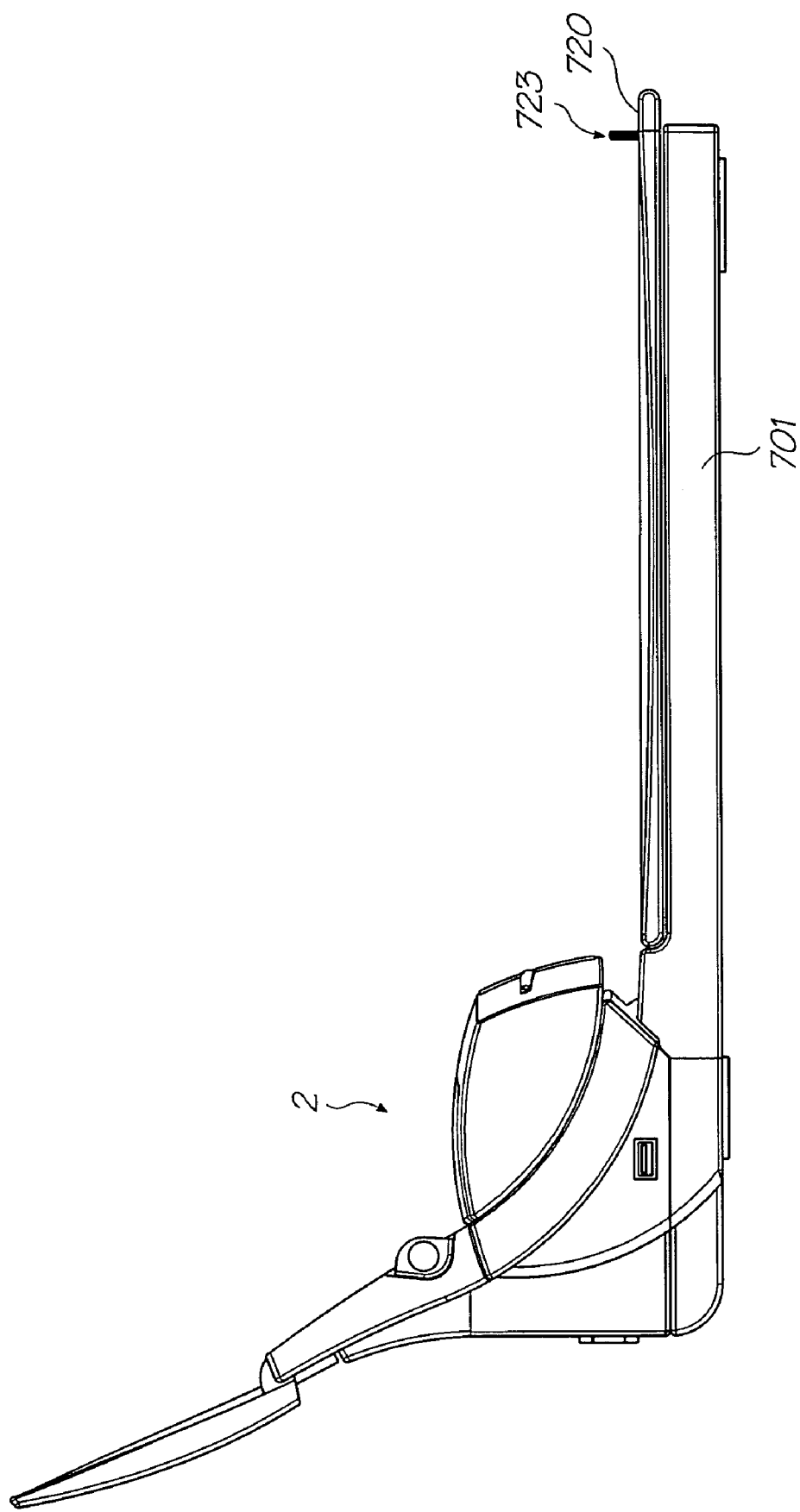
FIG. 32 shows a left side plan view of the multi-purpose image processing apparatus of FIG. 1.
Figure 33:
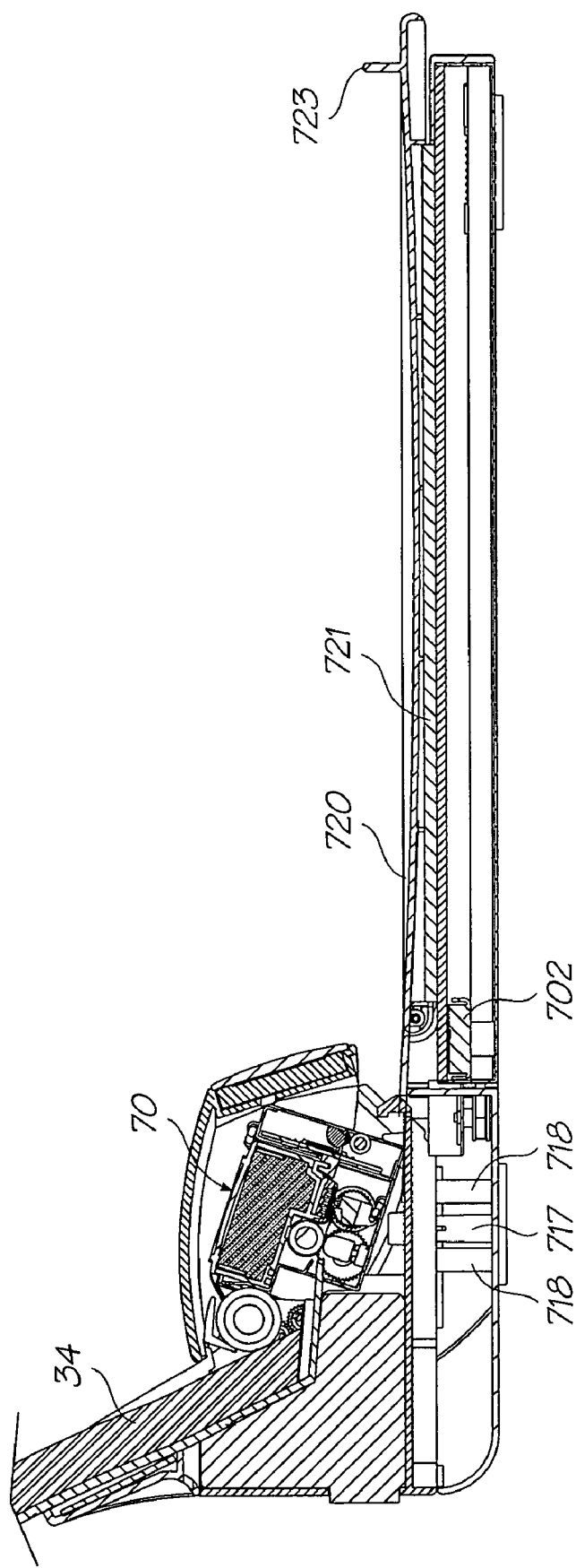
FIG. 33 shows a sectional side plan view of the multi-purpose image processing apparatus of FIG. 1.
Figure 34:
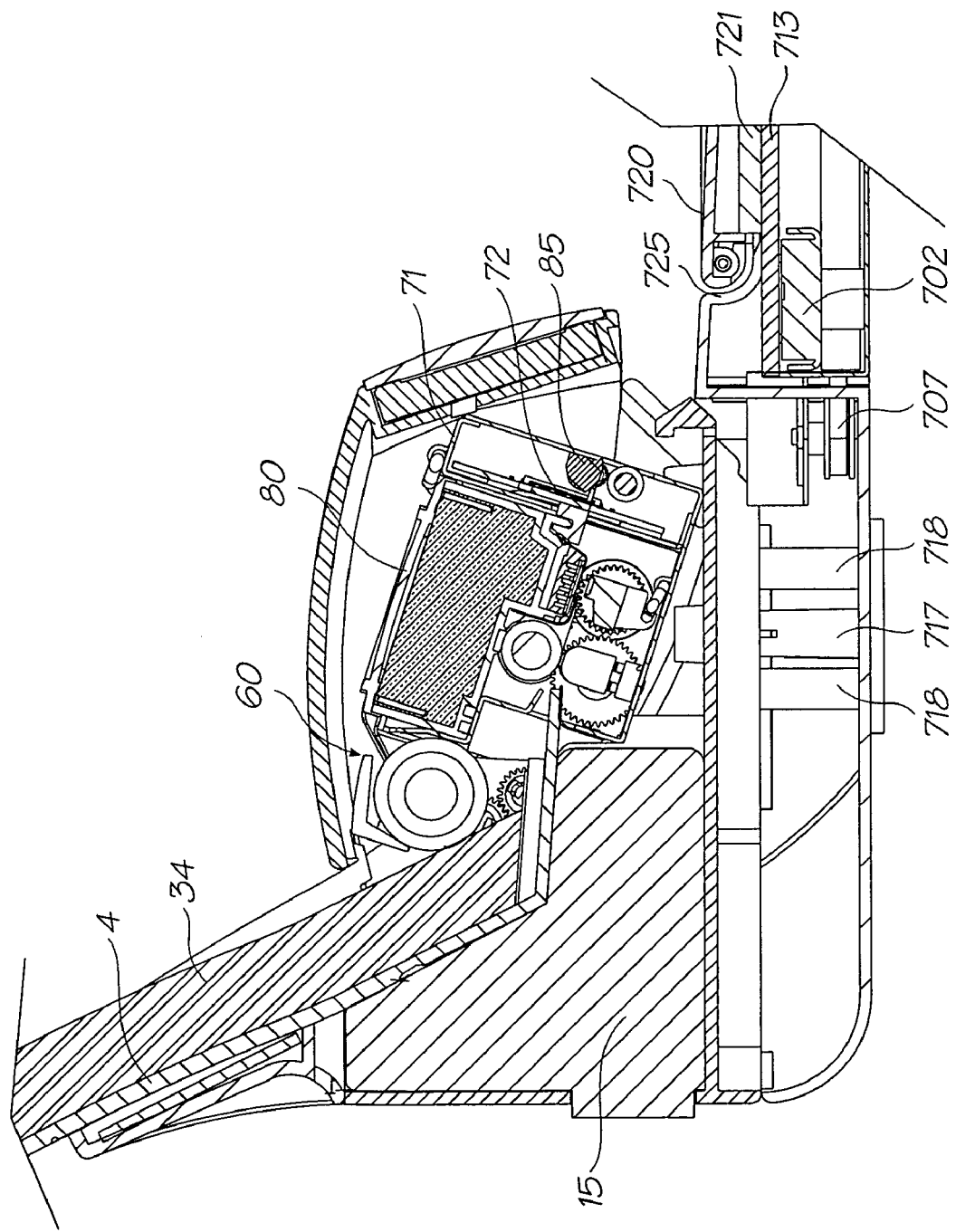
FIG. 34 shows an enlarged sectional side plan view of the multi-purpose image processing apparatus of FIG. 1.
Figure 35:
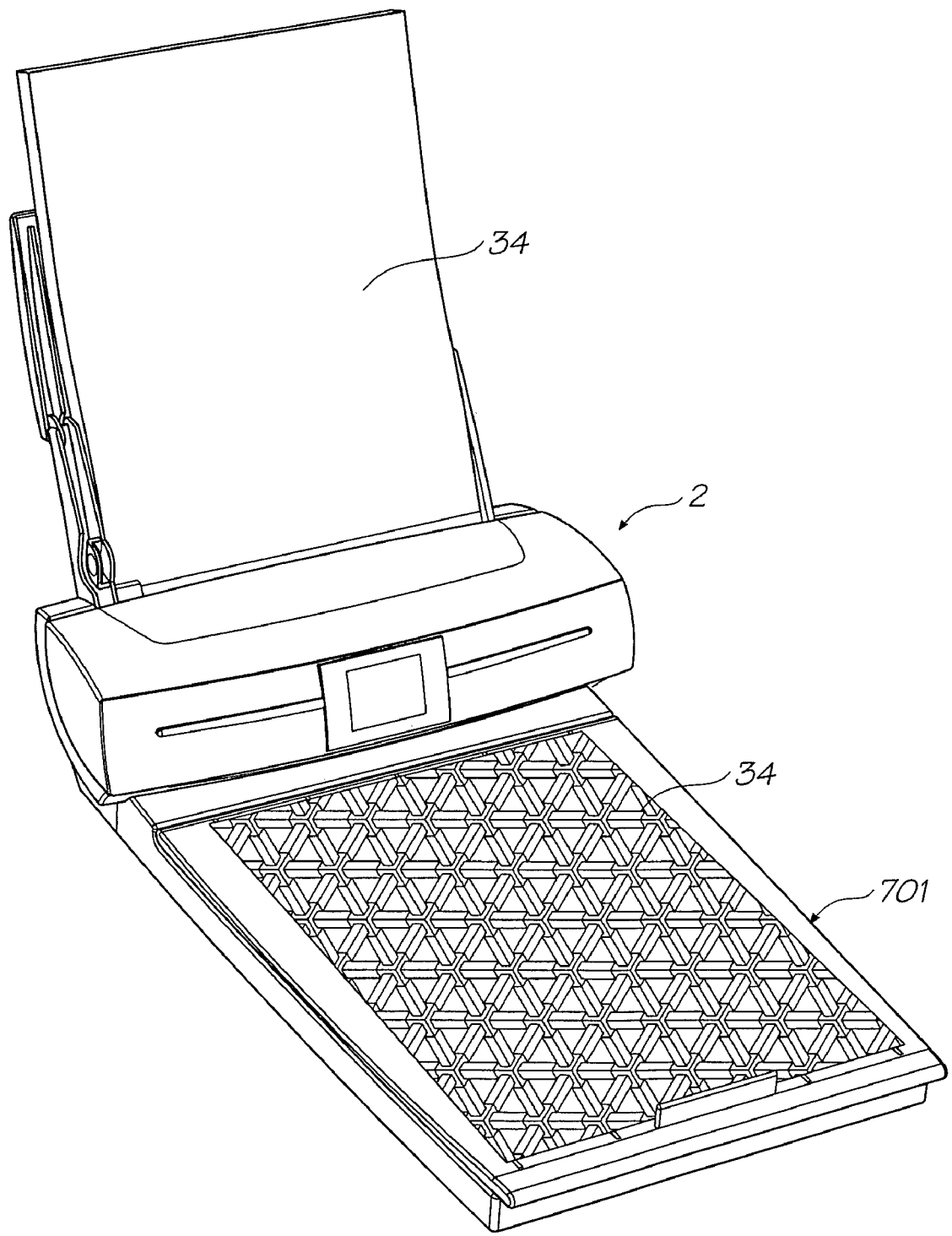
FIG. 35 shows a front perspective view of the multi-purpose image processing apparatus of FIG. 1 having the lid of the image reading unit functioning as media output assembly.

The printer unit 2 can then be placed within the seat portion 714 of the image reading unit 701, with the seat portion 714 shaped to conform to the general shape of the base 8 of the printer unit 2. Upon receival of the printer unit 2 within the seat portion 714, the receiving regions 59 formed on the base 8 of the printer unit 2 receive the locating elements 716 provided on the seat portion 714. In this regard, the raised tabs 718 are received within the corresponding substantially rectangular recesses of the receiving regions 59 and the cylindrical element 717 is received within the corresponding central circular recess of the receiving regions 59, thereby releasably securing the printer unit 2 to the image reading unit 701 in a nested arrangement. The spacer element 719 of the seat portion 714 acts against the base 8 of the printer unit 2 to provide further support of the printer unit 2 within the seat portion 714. The underside of the assembled arrangement is shown in FIG. 31.

In this arrangement, the controller 708 of the image reading unit 701 can be directly connected to the control system 72 of the printer unit 2 via appropriate electrical connections (not shown). Such electrical connections can be provided within the cylindrical element 717 to extend into the internal cavity 12 of the printer unit 2 to enable data transfer between the controller 708 of the image reading unit 701 and the control system 72 of the printer unit 2. Further, a power connection can be provided from the power supply unit 15 to provide operational power to the image reading unit 701 in a similar manner. In this regard, it is possible to operate the image reading unit 701 to read an image from a printed document and to process and send the image to the printer unit 2 for immediate printing. Further, the control system 72 can send the collected image data to a remote computer system or the like via the data connection sockets or WIFI cards provide on the printer unit 2. The image reading unit 701 is operated via the user display unit 26 mounted on the printer unit 2, such that a user can enter commands via the user display unit 26 to control the operation of the image reading unit 701.

In the assembled arrangement, as shown in FIGS. 32-35, the lid 720 of the image reading unit 701 extends from the printer unit 2 to collect printed media ejected therefrom, in the absence of the media output assembly 5. In this regard, the media 34 exits the printer unit 2 under action of the media exit mechanism 85 onto the lid 720 of the image reading unit 701. The end stop 723 collects the leading edge of the media 34 thereby retaining the printed media for collection.

Figure 36:
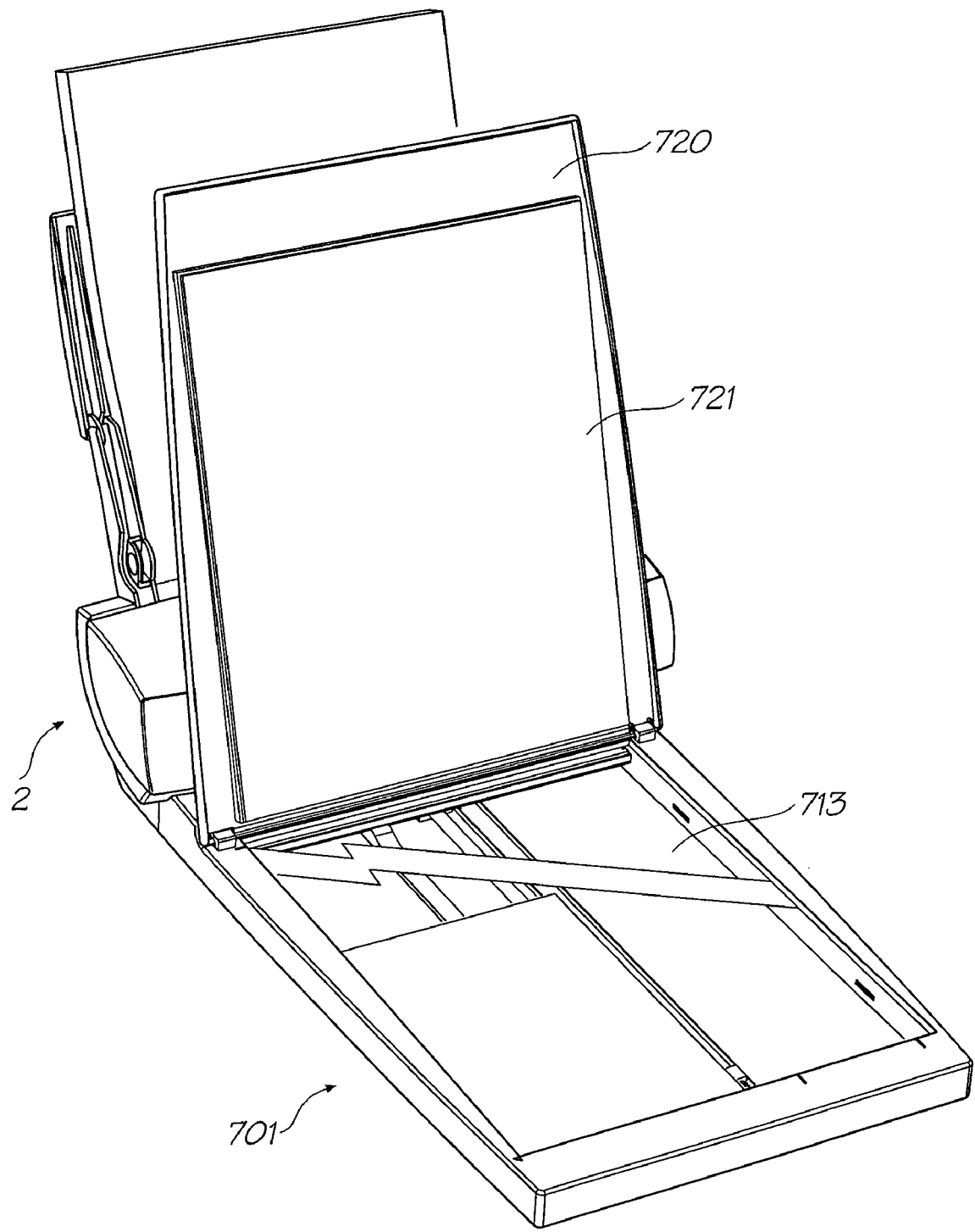
FIG. 36 shows a front perspective view of the multi-purpose image processing apparatus of FIG. 1 with the lid of the image reading unit in an open position exposing the reading surface of the image reading unit.

To facilitate the reading and recording of an image from a document using the image reading unit 701, the lid 720 is raised to enable the document to be placed on the surface of the glass panel 713. This arrangement is shown in FIG. 36. In this regard, the image reading unit 701 is constructed such that it can be readily operated in a conventional manner independently of the printer unit 2.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

What is claimed is:

1. A printer unit comprising:
 a body having a media input assembly for supporting media to be printed, and securing means for releasable engagement with complementary securing means on an image reader unit; and
 a print engine having a printhead and a control system for controlling operation of the printhead,
 wherein the body is shaped for nesting with the image reader unit such that the securing means are positioned for releasable engagement with the complementary securing means; and
 the body is configured so that the nested image reader unit extends outwardly from the print engine such that printed media is collected on a surface of the image reader unit.

2. A printer unit according to claim 1, wherein the print engine comprises a media exit mechanism for ejecting said printed media following printing.

3. A printer unit according to claim 2, wherein the media exit mechanism is arranged to cooperate with a stop member arranged on said surface of the image reader unit so that a leading edge of the ejected printed media is captured by said surface.

4. A printer unit according to claim 1, wherein the printhead is a pagewidth inkjet printhead having a plurality of ink ejection nozzles for ejecting ink onto a surface of the media as the media is transported therepast.

5. A printer unit according to claim 4, wherein said printhead is incorporated in a cartridge which is removably received by the print engine.

6. A printer unit according to claim 5, wherein the cartridge comprises at least one ink storage reservoir for storing ink for ejection by said ink ejection nozzles of said printhead.

7. A printer unit according to claim 5, wherein the print engine comprises a cradle and the cradle is configured to receive the cartridge.

8. A printer unit according to claim 7, wherein the cradle incorporates a media input mechanism for transporting input media from the media input assembly to said printhead.

9. A printer unit according to claim 8, wherein the control system controls the operation of the media input mechanism.

10. A printer unit according to claim 9, wherein the cradle incorporates the control system.

11. A printer unit according to claim 1, wherein the control system controls operation of the nested image reader unit.

* * * * *